United States Patent
Hisada et al.

(10) Patent No.: US 7,665,132 B2
(45) Date of Patent: Feb. 16, 2010

(54) REMOTE ACCESS VPN MEDIATION METHOD AND MEDIATION DEVICE

(75) Inventors: Yusuke Hisada, Saitama (JP); Yukio Tsuruoka, Tokyo (JP); Satoshi Ono, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 539 days.

(21) Appl. No.: 10/526,935

(22) PCT Filed: Jul. 2, 2004

(86) PCT No.: PCT/JP2004/009446

§ 371 (c)(1),
(2), (4) Date: Sep. 7, 2005

(87) PCT Pub. No.: WO2005/004418

PCT Pub. Date: Jan. 13, 2005

(65) Prior Publication Data

US 2006/0143702 A1 Jun. 29, 2006

(30) Foreign Application Priority Data

Jul. 4, 2003 (JP) .............................. 2003-271202

(51) Int. Cl.
*G06F 9/00* (2006.01)
*G06F 15/16* (2006.01)
*G06F 17/00* (2006.01)

(52) U.S. Cl. .............................. 726/15; 726/11; 726/27; 709/227; 709/229

(58) Field of Classification Search .................. 726/15, 726/27, 11; 709/227, 229
See application file for complete search history.

(56) References Cited

U.S. PATENT DOCUMENTS 6,557,037 B1 * 4/2003 Provino ...................... 709/227

(Continued)

FOREIGN PATENT DOCUMENTS

JP 3009876 12/1999

(Continued)

OTHER PUBLICATIONS

B. Patel, B. Aboba, S. Kelly, V. Gupta, "Dynamic Host Configuration Protocol (DHCPv4) Configuration of IPsec Tunnel Mode," [Online], Internet Engineering Task Force, The Internet Society, pp. 1-16, Jan. 2003.

(Continued)

*Primary Examiner*—William R Korzuch
*Assistant Examiner*—Sarah Su
(74) *Attorney, Agent, or Firm*—Oblon, Spivak, McClelland, Maier & Neustadt, L.L.P.

(57) ABSTRACT

A mediating apparatus is provided on an IP network, and stores an access control list (ACL) retained in a VPN gateway unit. The mediating apparatus: receives a retrieval request from a VPN client unit; acquires a private IP address of a communication unit by reference to ACL; searches DNS to acquire therefrom an IP address of the VPN gateway unit; generates a common key that is used for authentication between the VPN client unit and the VPN gateway unit and for encrypted communication therebetween; sends the IP address of the VPN gateway unit, the private IP address of the communication unit, and the common key to the VPN client unit; and sends the IP address of the VPN client unit and the common key to the VPN gateway unit.

15 Claims, 17 Drawing Sheets

U.S. PATENT DOCUMENTS

| | | | |
|---|---|---|---|
| 2002/0069278 A1 | 6/2002 | Forslöw | |
| 2002/0124090 A1* | 9/2002 | Poier et al. | 709/228 |
| 2003/0039240 A1* | 2/2003 | Sutanto | 370/352 |
| 2003/0123481 A1 | 7/2003 | Neale et al. | |
| 2004/0088542 A1* | 5/2004 | Daude et al. | 713/156 |
| 2004/0208151 A1* | 10/2004 | Haverinen et al. | 370/338 |
| 2004/0266420 A1* | 12/2004 | Malinen et al. | 455/421 |
| 2009/0083830 A1* | 3/2009 | Lum et al. | 726/1 |

FOREIGN PATENT DOCUMENTS

| | | |
|---|---|---|
| JP | 2001-160828 | 6/2001 |
| JP | 2001-292135 | 10/2001 |
| JP | 2002-208965 | 7/2002 |
| JP | 2002-271309 | 9/2002 |
| JP | 2003-018163 | 1/2003 |
| JP | 3454788 | 7/2003 |
| WO | WO 03/043250 A1 | 5/2003 |

OTHER PUBLICATIONS

G. McGregor, The PPP Internet Protocol Control Protocol (IPCP), RFC 1332, May 1992.

L. Blunk, J. Vollbrecht, PPP Extensible Authentication Protocol (EAP), The Internet Society, RFC 2284, pp. 1-14, Mar. 1998.

C. Ellison, B. Frantz, B. Lampson, R. Rivest, B. Thomas, T. Ylonon, "SPKI Certificate Theory," [Online] RFC 2693, Internet Engineering Task Force, The Internet Society, pp. 1-38, Sep. 1999.

C. Ellison, B. Frantz, B. Lampson, R. Rivest, B. Thomas, T. Ylonon, "Simple Public Key Infrastructure" [Online], p. 1-41, Jul. 26, 1999.

\* cited by examiner

1041T

| HASH_B | ACL |
|--------|-----|
| HASH_B1 | ACL1 |
| HASH_B2 | ACL2 |
| ⋮ | ⋮ |

ACL1

| ACCESS OBJECT | ACCESS SUBJECT |
|---------------|----------------|
| IPADDRESS_C1 | HASH_A |
| IPADDRESS_C2 | HASH_D |
| ⋮ | ⋮ |

```
(acl
    (entry
        (subject hash sha 1  |HASH_A|)
        (tag(dns Name of Domein Name Server DNS ((hash sha 1  |HASH_B|))
            (ip IPADDRESS_C)
            (attribute ATTRIBUTE_A))
        (propagate)
        (validity(not-before Time Data)(not-after Time Data))
    )
)
```

```
(tag(dns Name of Domein Name Server DNS ((hash sha 1  |HASH_B|)))
```

Data Defined as Data TAG

```
(cert
    (issuer Seif)
    (subject (hash sha 1 |HASH_A|))
    (tag(dns Name of Domein Name Server DNS ((hash sha 1  |HASH_B|)))
    (propagate)
    (validity(not-before Time Data)(not-after Time Data))
)
```

`[ ]` Data Defined as Calculated Data TAG

FIG. 10

```
(cert
    (issuer (hash sha 1 |HASH_A|))
    (subject (hash sha 1  |HASH_D|))
    (tag(dns Name of Domein Name Server DNS ((hash sha 1  |HASH_B|)))
    (delegation (propagate))
    (validity(not-before Time Data)(not-after Time Data))
    (signature       )
)
```

`[ ]` Data Defined as Certificate CERT

`[ ]` Data Defined as Certificate Information INFO

FIG. 11

```
(acl                                        Entry for VPN Client Unit A1
    (entry
        (subject hash sha1 |HASH_A1|)
        (tag(dns Name of Domain Name Server (hash sha1 |HASH_B|))
            (ip IPADDRESS_C1)
            (attribute(VLAN Personel Division VLAN)))
        (propagate)
        (validity(not-before time data)(not-after time data))
    )
                                             Entry for VPN Client Unit A2
    (entry
        (subject hash sha1 |HASH_A2|)
        (tag(dns Name of Domain Name Server (hash sha1 |HASH_B|))
            (ip IPADDRESS_C2)
            (attribute(VLAN Accounting Division VLAN)))
        (propagate)
        (validity(not-before time data)(not-after time data))
    )
)
```

FIG. 20

REMOTE ACCESS VPN MEDIATION METHOD AND MEDIATION DEVICE

TECHNICAL FIELD

The present invention relates to techniques by which, of pieces of information for implementation of a remote-access VPN by an arbitrary tunneling protocol, such as IPsec (IPsecurity Protocol) or L2TP (Layer2 Tunneling Protocol), a global IP address of a VPN client unit, a global IP address of a VPN gateway unit, and mutual authentication information to be used for authentication between the VPN client unit and the VPN gateway unit are shared in security between them.

BACKGROUND ART

A virtual closed network that is built up on the Internet is commonly called a Virtual Private Network (hereinafter abbreviated as VPN). The VPN is built using such a tunneling protocol as IPsec, L2TP or the like, and it is used for accessing a resource in a local area network (LAN) from a moving client via the Internet, or for interconnecting multiple physically dispersed local area networks via the Internet. In the case of authorizing a remote user to access a remote-access VPN, the following settings are required of both of the VPN client to access and the VPN gateway to be accessed.

VPN Client Unit:
IP address (global) of a VPN gateway unit
Mutual authentication information between the VPN gateway unit and a VPN client unit
Private IP address of the VPN client unit
Private IP addresses of a router and a name server (such as DNS,WINS) of an internal network of VPN (in the case of static setting on the part of the VPN client)

VPN Gateway Unit:
Mutual authentication information between the VPN gateway unit and the VPN client unit
Private IP address to be delivered to an authenticated VPN client unit and private IP addresses of the router and the name server in VPN (in the case of dynamic setting/posting on the part of VPN client)

In general, these settings affect security, and hence they must be done with security and with reliability, which places a heavy load not only on a VPN client unit user but also on a VPN administrator. And, when users accessible to this VPN change one after another, the burden of user management also becomes tremendous. Further, when a user accesses two or more VPNs, an authentication method, authentication information, and an IC card or similar authentication device for retaining them may sometimes differ for each VPN to be connected; the management therefor becomes a serious burden.

Occasionally the situation arises where the VPN client unit wants to temporarily exercise its granted VPN access authority in another VPN client unit. Further, in the case where the VPN client unit (A) is inside an NAT (Network Address Translation) segment or where it is a portable miniature device of severely limited power requirements, it is not proper to directly establish an encrypted channel for communication with the VPN gateway unit. In this instance, it is typical that another VPN client unit (D), which possesses the function of gateway from the NAT segment concerned to the Internet, takes the charge of establishing a tunnel to the VPN gateway. In this case, access control needs to be conducted for the VPN client unit (A), not for the VPN client unit (D). Thus, when the VPN client unit granted the access authority differs from the VPN client unit from which the tunnel starts, a mechanism for delegating authority is indispensable.

Moreover, depending on the property of the service offered by VPN, the VPN client unit user may sometimes want to avoid divulgence of personally identifiable information to the VPN service provider. On the other hand, the VPN service provider also wants, in many cases, to devote themselves to offering their primary services by outsourcing complicated operations such as handling client authentication information or similar personal information and management of members' admission and withdrawal. In this instance, the VPN service provider makes the outsourcer perform user authentication and verification of the access authority and introduce only valid users to the VPN service provider.

Secure distribution of the common key can be achieved by various methods (see patent documents 1 and 2, for instance). The method set forth in patent document 1 is a method that exchanges the common key between two or more communication units connected to a local area network; this method exchanges the common key via the gateway unit equipped with a DHC server function. More specifically, at the time of connecting the communication units to the local area network, the common key is exchanged simultaneously with acquisition of their IP addresses by DHCP. This permits exchanging the common key for encrypting communications in the local area network.

The method described in patent document 2 is a method by which, in the communication between the VPN client unit connected to the Internet and the communication unit connected to the local area network placed under the management of the VPN gateway unit, a common key is exchanged between the VPN client unit and the VPN gateway unit, and another common key is exchanged between the VPN gateway unit and the communication unit. This permits implementation of encrypted communication between the VPN client unit and the communication unit connected to the local area network without the need for a key exchange by an IKE or similar key exchange scheme between the VPN client unit and the communication unit connected to the local area network.

However, the method of patent document 1 limits the key distribution range to the local area network and the method of patent document 2 calls for pre-exchanging of the common key between the VPN client unit and the VPN gateway unit, and for these reasons, the management operations become complicated, for example, in the case where the admission and withdrawal of members of a society occur frequently. And either method does not provide a function of delegating access control to a third party and a function of allowing the VPN client unit to delegate encrypted communication processing to another reliable VPN client unit for access to the VPN gateway to which the VPN client unit is authorized to be connected. There are proposed various methods by which the VPN gateway side dynamically sets/posts the configuration management information, such as the private IP address to be delivered to the authenticated VPN client unit, private addresses of a router and a name server in VPN (see, for example, patent document 3, patent document 4, non-patent document 1, non-patent document 2, and non-patent document 3).

According to patent document 3, a management unit for management of setting information is provided, which logs in to a communication unit by presenting thereto its IP address and a log-in password to transfer the setting information. With this method, configuration management information, such as the private IP address and so on, can be distributed as setting information to the VPN client unit from the management unit corresponding to the VPN gateway unit. However, this method does not authenticate the VPN client unit that is a receiver—this poses a danger of impersonation attack by masquerading of the IP address and intermediator attack. Further, no mention is made of how the management unit performs authentication/access control when the VPN client unit issues a request for acquisition of the configuration management information.

Patent document 4, non-patent document 1, non-patent document 2 and non-patent document 3 all set forth methods of dynamic setting/posting of the configuration management information by such tunneling protocols as IPsec, PPP, L2TP, and the like. The present invention also makes an assumption that the function corresponding to the above-mentioned dynamic setting/posting is performed in the set-up phase of various tunnel protocols between the VPN client unit and the VPN gateway unit. But, according to the conventional systems, user authentication or access control and the dynamic setting/posting of the above-mentioned configuration management information are carried out as a single, integral operation at the time of tunnel set-up; in contrast thereto, according to the present invention, the user authentication and the access control are performed in a mediating apparatus to allow the VPN client unit and the VPN gateway unit to share a common secret, which is used to set up a tunnel between the VPN client unit and the VPN gateway unit, and then the configuration management information about the tunnel is dynamically set/posted from the VPN gateway unit. Besides, the VPN client unit A delegates the tunnel protocol processing for encrypted communication to another reliable VPN client unit D, by which it is possible to make a check of the access authority in the mediating apparatus for the source unit B. According to management convenience, part of the configuration management information on the tunnel, information for routing to the tunnel, or similar information about network operation, may be sent from the mediating apparatus to the VPN client unit. In this instance, the configuration management information sent from the mediating apparatus is set before or after tunnel setup in accordance with the kind of information. As an authentication and a certificate issuing method using a public key, there is proposed an SPKI (Simple Public Key Infrastructure) scheme (for example, non-patent document 4, and non-patent document 5), but it is not clear how to apply the scheme to the remote-access VPN.

Patent document 1: Japanese Patent Application Kokai Publication No. 2001-292135

Patent document 2: Japanese Patent Application Kokai Publication No. 2002-271309

Patent document 3: Japanese Patent Application Kokai Publication No. 2003-18163

Patent document 4: Japanese Patent Application Kokai Publication No. 2001-160828

Non-patent document 1: B. Patel, B. Aboba, S. Kelly, V. Gupta, "Dynamic Host Configuration Protocol (DHCPv4) Configuration of IPsec Tunnel Model," [online], published January, 2003. RFC3456, Internet Engineering Task Force, [Retrieved Mar. 17, 2003], Internet www.ietf.org/rfc/rfc3456.txt Non-patent document 2: IPCP (RFC-1332)

Non-patent document 3: EAP (RFC-2284)

Non-patent document 4: C. Ellison, B. Frantz, B. Lampson, R. Rivest, B. Thomas, T. Ylonen, "SPKI Certificate Theory," [online], published September 1999, RFC2693, Internet Engineering Task Force, Internet www.ietf.org/rfc/rfc2693.txt>

Non-patent document 5; C. Ellison, B. Frantz, B. Lampson, R. Rivest, B. Thomas, T. Ylonen, "Simple Public Key Infrastructure <draft-ieft-spki-cert-structure-0.6.txt>" [online], published Jul. 26, 1999, Internet Engineering Task Force, Internet world.std.com/~cme/spki.txt

DISCLOSURE OF THE INVENTION

Problem to be Solved by the Invention

In view of the above-described problems, the present invention has been made by which, of pieces of information to be used for implementing a remote-access VPN by an arbitrary tunneling protocol, such as IPsec and L2TP, in an IP network, a global IP address of a VPN client unit, a global IP address of a VPN gateway unit, a private IP address of an arbitrary communication unit in a local area network placed under the control of the VPN gateway unit, and a common key to be used for authentication in an IKE phase 1 between the VPN client unit and the VPN gateway unit can be shared therebetween with security. Further, the invention is to enable communication for authentication in remote-access VPN without leakage of user's personal information to the other party.

Means for Solving the Problem

According to the present invention, there is provided a remote-access VPN mediating method in a system wherein: a virtual private network, hereinafter referred to as VPN, client units and a VPN gateway unit are connected to an IP network; communication units are connected to a local area network placed under the management of the VPN gateway unit; and a remote-access VPN by a tunneling protocol is implemented between an arbitrary one of VPN client units and the VPN gateway unit connected to said IP network and an arbitrary one of the communication units connected to the local area network placed under the management of the VPN gateway unit, said method comprising the steps of:

(a) sending an access control list containing information indicative of a private IP address assigned to said communication unit to a mediating apparatus on said IP network from said VPN gateway unit;

(b) storing said access control list by said mediating apparatus in correspondence to said VPN gateway unit;

(c) retrieving an IP private address corresponding to said VPN gateway unit in response to a request from said VPN client unit, acquiring the private IP address of the corresponding communication unit from said access control list, sending the acquired private IP address to said VPN client unit, sending the IP address of said VPN client unit to said VPN gateway unit, generating mutual authentication information for setting up an authenticated encrypted tunnel between said client VPN unit and said gateway unit, and sending said mutual authentication information to both of said VPN client unit and said gateway unit; and (d) setting up said authenticated encrypted tunnel between said VPN client unit and said gateway unit by use of said mutual authentication information, and implementing remote access through said encrypted tunnel by use of the private IP address of said communication unit.

According to the present invention, there is provided a remote-access VPN mediating apparatus which is built on an IP network to implement a remote-access VPN in a system wherein: VPN client units and a VPN gateway unit are connected to the IP network; communication units are connected to a local area network placed under the management of said VPN gateway unit; and a remote-access VPN by a tunneling protocol is implemented between an arbitrary one of said VPN client units and said VPN gateway unit connected to said IP network and an arbitrary one of said communication units connected to said local area network placed under the management of said VPN gateway unit, said apparatus comprising:

ACL storage means for storing an access control list, hereinafter referred to as ACL, sent from said VPN gateway unit and containing information indicative of the private IP address assigned to said communication unit;

authentication/access authorization control means for authenticating said VPN client unit and said gateway unit, and for executing access authorization control;

IP address acquiring means for referring to said access control list to acquire the private IP address assigned to said communication unit, and for searching a domain name server to acquire the IP address assigned to said VPN gateway unit;

authentication information generating means for generating mutual authentication information for setting up an encrypted tunnel between said VPN client unit and said VPN gateway unit; and communication means for sending the IP address of said VPN gateway unit, the private IP address of said communication unit and said mutual authentication information to said VPN client unit, and for sending the IP address of said PN client unit and said mutual authentication information to said VPN gateway unit.

Effect of the Invention

The present invention produces such effects as described below. A first effect resides in that, of pieces of information to be used for implementing a remote-access VPN by an arbitrary tunneling protocol, such as IPsec and L2TP, in an IP network, a global IP address of a VPN client unit, a global IP address of a VPN gateway unit, a private IP address of an arbitrary communication unit in a local area network placed under the control of the VPN gateway unit, and a common key or common secret (hereinafter referred to as mutual authentication information) necessary for mutual authentication for setting up an encrypted tunnel between the VPN client unit and the VPN gateway unit can be shared therebetween with security. The reason for this is secure management of the private IP address in the mediating apparatus and secure distribution of the private IP address and the mutual authentication information.

Specifically speaking, in the case of entry of the private IP address thereinto, the mediating apparatus authenticates the VPN gateway unit and, only when the authentication is successful, encrypts the communication channel, and receives the private IP address over the encrypted communication channel. In the case of retrieval of the private IP address, the mediating apparatus: authenticates the VPN client unit; and, only when the authentication is successful, effects access authorization control by use of the public key of the VPN client unit; and, only when the access authorization control is successful, acquires the global IP address of the VPN gateway unit from the domain name server; encrypts the communication channel between the mediating apparatus and the VPN client unit; sends the global IP address of the VPN gateway unit, the private IP address of the communication unit, and the mutual authentication information to the VPN client unit over the encrypted communication channel; and encrypts the communication channel between the mediating apparatus and the VPN gateway unit; sends the global IP address of the VPN client unit, the mutual authentication information, and attribute information of the VPN client unit to the VPN gateway unit.

A second effect is to provide means by which communication in the authentication for remote-access VPN can be conducted without leakage of user's personal information to the other party of communication. The reason for this is that in the case of authentication by the PKI scheme, a common key certificate containing personal information is sent to the mediating apparatus for authentication in place of the other party of communication. Another reason resides in that in the case of authentication by the SPLI scheme, the format of any certificate can be so defined as not to contain personal information. On the other hand, the mediating apparatus may be associated with: a function of sending the attribute information accompanying the authentication result to the VPN gateway unit to select VLAN for accommodating the VPN client unit concerned; a function of changing packet filtering setting of the VPN gateway unit concerned; and a function of adding the attribute information concerned to an inverted dictionary of DNS in VPN in the entry corresponding to the private IP address of the VPN client unit.

BRIEF DESCRIPTION OF THE DRAWINGS

[FIG. 4] A is a table showing the correspondence between ACL and hash values, and B is a diagram showing an example of an ACL entry in FIG. 4A.

[FIG. 10] is a diagram showing an example of calculated result data DATA in the first embodiment of the present invention.

[FIG. 11] is a diagram showing an example of a certificate in the first embodiment of the present invention. Its program can be distributed via a network.

[FIG. 20] is a diagram showing an example of an access control list for use in the fourth embodiment.

BEST MODE FOR CARRYING OUT THE INVENTION

A detailed description will hereinbelow be given, with reference to the accompanying drawings, of embodiments of the present invention.

EMBODIMENT 1

This is an embodiment in which a mediating apparatus authenticates a VPN client unit and a VPN gateway unit by an SPKI (Simple Public Key Infrastructure) scheme, and the VPN client unit issues a certificate for the delegation of authority. This SPKI scheme does not require an authentication station.

Figure 1:
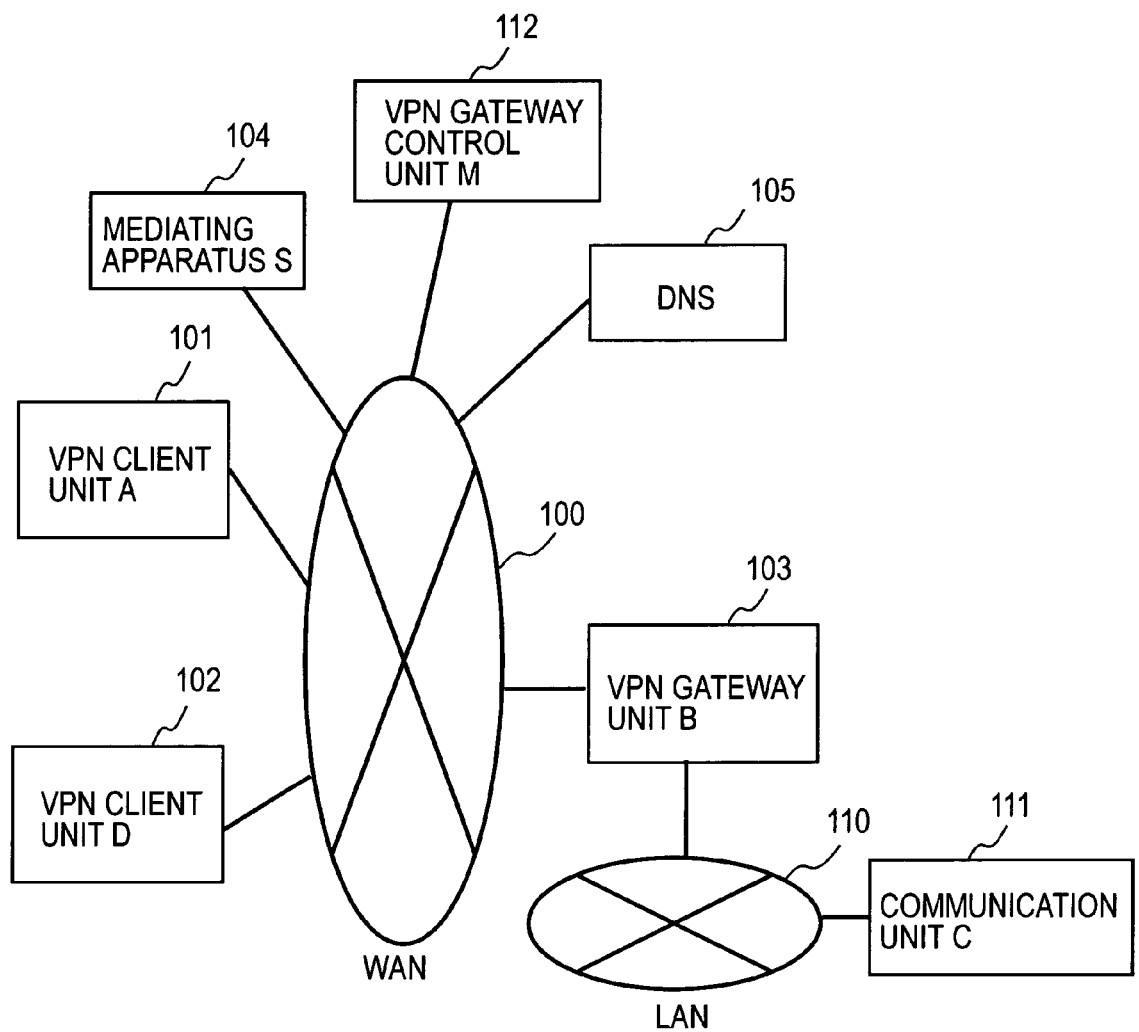
[FIG. 1] is a diagram illustrating an example of a system configuration in a first embodiment of the present invention.

FIG. 1 illustrates a general system configuration of this embodiment. In FIG. 1 a VPN client unit (A) 101, a VPN client unit (D) 102, a VPN gateway unit (B) 103, a mediating apparatus (S) 104, and a domain name server (DNS) 105 are each connected to a Wide Area Network (WAN) 100 under IP (Internet Protocol). A communication unit (C) 111 is connected to a Local Area Network (LAN) 110 that uses the VPN gateway unit (B) 103 as a gateway unit. On WAN there may also be provided a VPN gateway control unit (M) 112 that has the authority of management of an access control list for the VPN gateway unit (B) 103.

Figure 2:
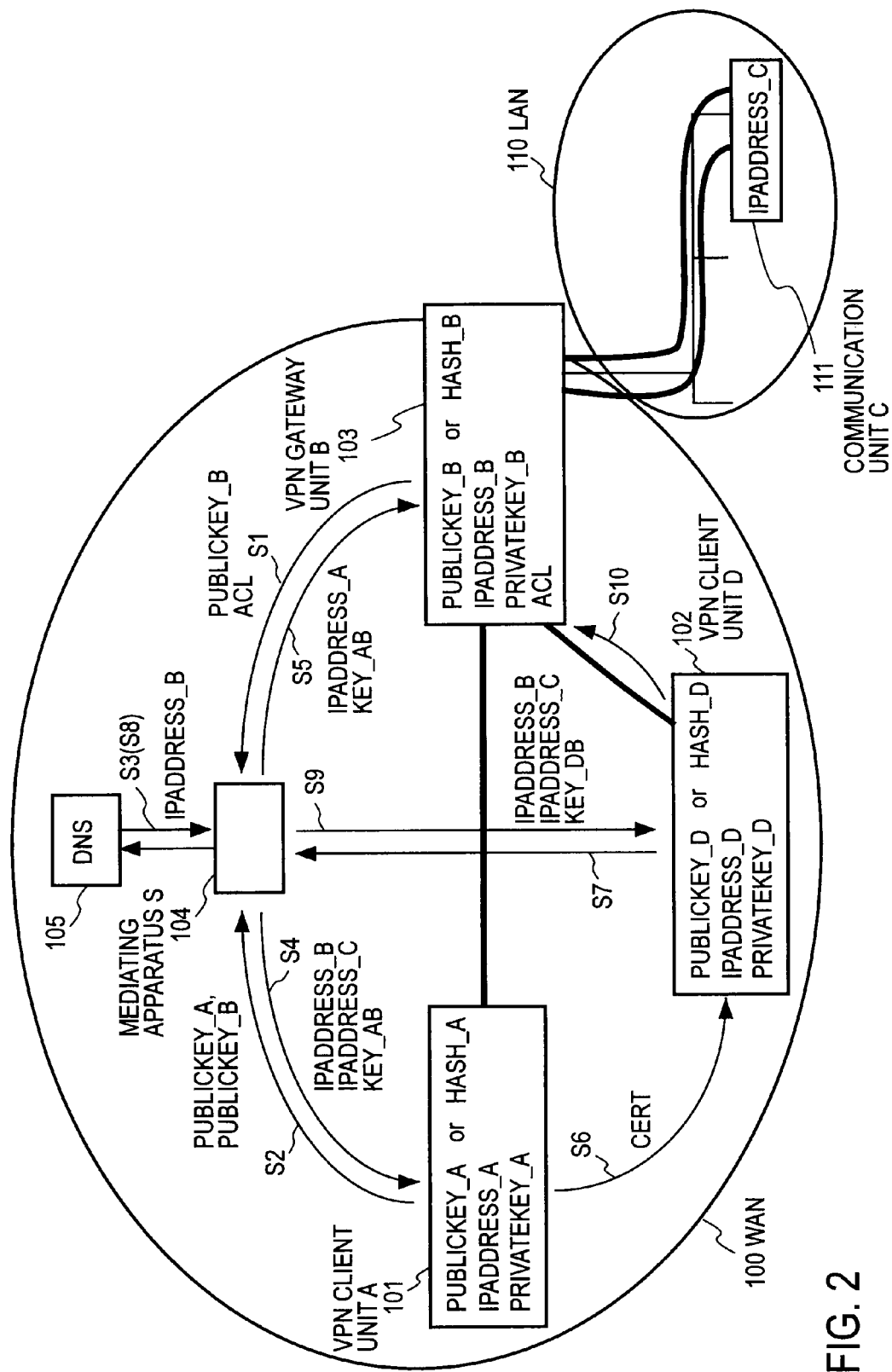
[FIG. 2] is a diagram for explaining the general outline of the operation of the first embodiment of the present invention.

FIG. 2 is a diagram for explaining the operation of the entire system depicted in FIG. 1. The thick lines indicate VPNs in an IPsec tunnel mode.

Now, let the host name of the VPN client unit (A) 101 be represented by a public key PUBLICKEY_A (or its hash value HASH_A) and its IP address by IPADDRESS_A. Let the host name of the VPN client unit (D) 102 be represented by a public key PUBLICKEY_D (or its hash value HASH_D) and its IP address by IPADDRESS_D. And, let the host name of the VPN gateway unit (B) 103 be represented by a public key PUBLICKEY_B (or its hash value HASH_B) and its IP address by IPADDRESS_B. Thus the VPN client unit and the VPN gateway unit can be identified by their public keys (or their hash values). Let the private IP address of the communication unit (C) 111 be represented by IPADDRESS_C.

The IP address IPADDRESS_A assigned to the VPN client unit (A) 101, the IP address IPADDRESS_B assigned to the VPN gateway unit (B) 103, and the IP address IPADDRESS_D assigned to the VPN client unit (D) 102 are all unique in the IP network (WAN) 100, and they are dynamically assigned by arbitrary means. The public key PUBLICKEY_B and the IP address IPADDRESS_B of the VPN gateway unit (B) 103 are uniquely associated with each other and placed under the management of the domain name server (DNS) 105. The private IP address IPADDRESS_C assigned to the communication unit 111 is unique in the local area network (LAN) 110, and it is dynamically assigned by arbitrary means.

The VPN client unit (A) 101, the VPN client unit (D) 102, the VPN gateway unit (B) 103, and the mediating apparatus (S) 104 each have means for encrypting a channel by an IPsec transport mode or IPsec tunnel mode. The VPN client unit (A) 101 retains, together with the public key PUBLICKEY_A, a private key PRIVATEKEY_A that pairs with the public key PUBLICKEY_A. The VPN gateway unit (B) 103 retains, together with the public key PUBLICKEY_B, a private key PRIVATEKEY_B that pairs with the public key PUBLICKEY_B. The VPN client unit (D) 102 retains, together with the public key PUBLICKEY_D, a private key PRIVATEKEY_A that pairs with the public key PUBLICKEY_D. The VPN gateway unit (B) 103 retains an Access Control List (ACL) that describes conditions necessary for access to the communication unit 111 on the local area network 110.

Figures 8, 9:
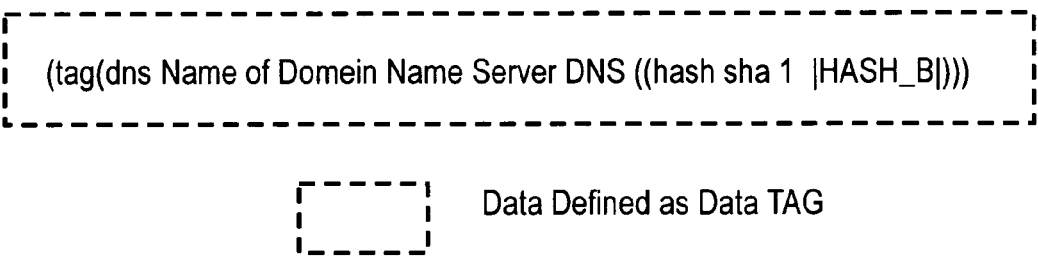
[FIG. 8] is a diagram showing an example of the access control list ACL in the first embodiment.
[FIG. 9] is a diagram showing an example of data TAG in the first embodiment of the present invention.

FIG. 8 shows an example of the access control list (ACL) in this embodiment. The grammar of the access control list (ACL) is defined in the afore-mentioned non-patent documents 4 and 5 concerning SPKI. In the FIG. 8 example, it is specified that the hash value of the public key of an access subject by a hash sha 1 written in a subject field (subject) has HASH_A—this indicates that the subject is allowed to access the communication unit11 that has the private IP address IPADDRESS_C on the local area network 110 connected to the VPN gateway unit 103 having a sha 1 hash value HASH_A described in a tag field (tag). The field of attribute information "ATTRIBUTE_A" is provided as an additional function, by which, for example, the range of private addresses to be assigned is changed with a "non-paying user" and a "paying user," thereby permitting changing of the accessible server by packet filtering in the VPN gateway unit (B) 103, or changing of the service by a Web server to a client in accordance with the source address. The field "validity" indicates the period for which this entry of ACL is valid. The field "propagate" indicates authorization of the delegation of authority of the access subject, but since no delegation of authority is made in this embodiment, this field is used as a mere data value for authentication, together with other fields.

Figure 3:
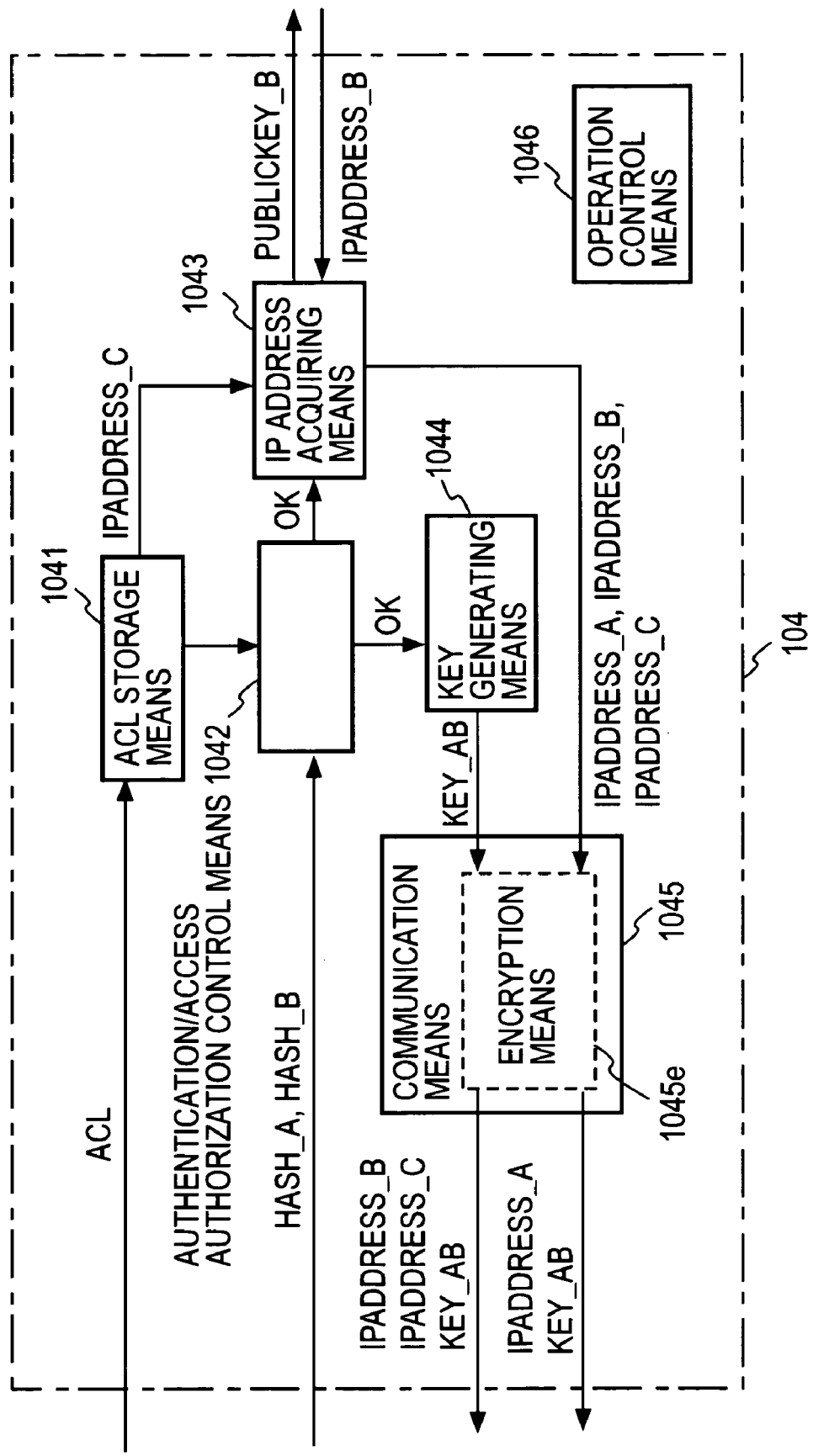
[FIG. 3] is a diagram showing the functional configuration of mediating an apparatus (S) 104 of the present invention.

The mediating apparatus (S) 104 comprises, as shown in FIG. 3, access control list (ACL) storage means 1041, authentication/access authorization control means 1042, IP address acquiring means 1043, key generating means 1044 serving as mutual authentication information generating means, communication means 1045 having encryption means 1045e, and operation control means 1046 for controlling operations of these means. The IP address acquiring means 1043 presents the public key PUBLICKEY_B of the VPN gateway unit (B) 103 to the domain name server (DNS) 105 and acquires therefrom the IP address IPADDRESS_B assigned to the VPN gateway unit (B) 103. The ACL storage means 1041 stores, as a table, the access control list (ACL) entered from the VPN gateway unit (B) 103. The authentication/access authorization control means 1042 uses the SPKI scheme to authenticate the VPN client unit (A) 101 and the VPN gateway unit (B) 103 by the SPKI scheme and/or execute access authorization control. The communication unit 1045 has the encryption means 1045e, by which the communication channel is encrypted to provide security for transmission and reception of information. The key generating means 104, which serves as mutual authentication information generating means, generates common keys KEY_AB and KEY_DB as mutual authentication information described later on.

Figures 4A, 4B, 5:
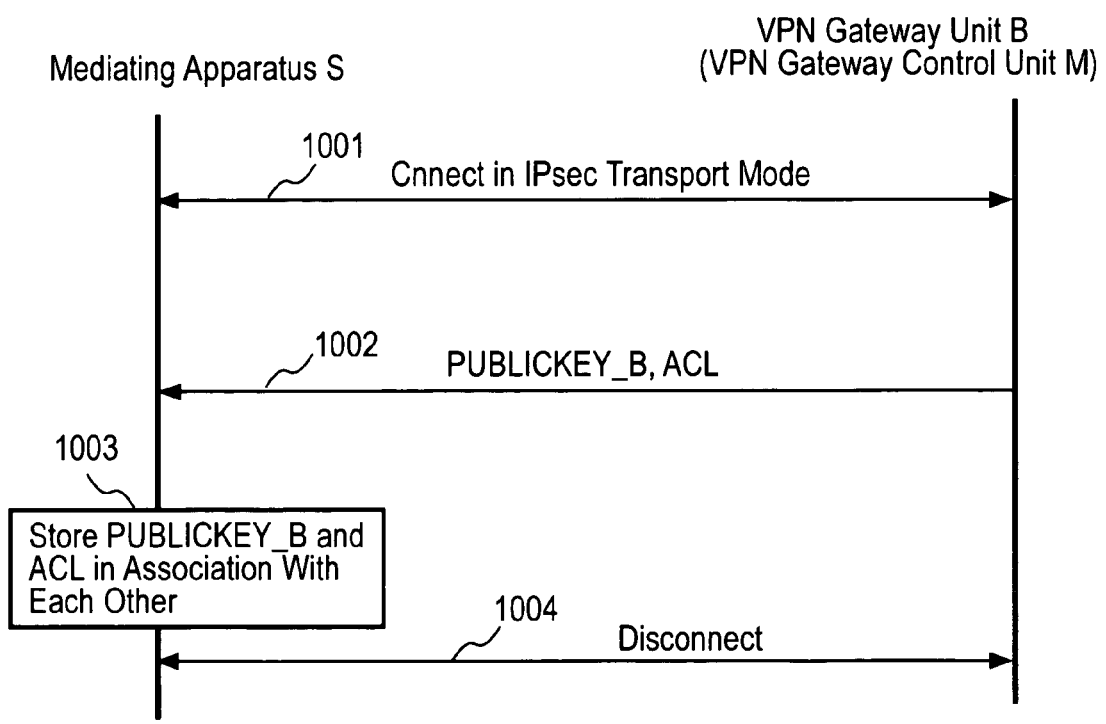
[FIG. 5] is a diagram showing access control ACL storage means in the first embodiment of the present invention.

The above-mentioned address acquiring means 1043 retrieves the IP address IPADDRESS_B from the public key PUBLICKEY_B by a common IP address retrieval scheme (name resolution scheme). The above-mentioned ACL storage means 1041 manages the public key PUBLICKEY_B and the access control list (ACL) in association with each other, for example, in the form of a table 1041T as depicted in FIG. 4A. In FIG. 1 there is shown only one VPN gateway unit, but in fact, multiple VPN units have their local area networks connected to WAN 100; and while only one communication unit is shown in FIG. 1, multiple communication units are supposed to be connected to each local area network. In FIG. 4A access control lists are entered in correspondence to hash values of public keys of the respective VPN gateway unit.

Each access control list ACL in the ACL table 1041, for example, ACL 1, is shown as Table ACL1 in FIG. 4B, wherein hash values of public keys unique to subjects, for example, VPN client units, which access the respective communication units on the local area networks to which the access subjects belong, are given in correspondence to private IP addresses of the respective communication units. In the example on the first line in the table of FIG. 4B it is indicated that the VPN client unit of the hash value HASH_A is authorized to access the communication unit of the private IP address IPADDRESS_C1. In practice, it is described in the form shown in FIG. 8 referred to previously. The access subject in the access control list ACL provided for each unit to be accessed is not limited specifically to the hash value of the public key as in the examples of FIGS. 4A and 8, but it may also be various other identification such as an employee number, membership number, or number certifying that the access subject is an employee of some company, member of some group, or qualified person.

The above-mentioned authentication/access authorization control means 1042 authenticates the VPN client unit (A) 101, the VPN gateway unit (B) 103, and the VPN client unit (D) 102 by the SPKI scheme. Specifically speaking, upon input thereto of a signature SIG_A by a private key PRIVATEKEY_A and a pubic key PUBLICKEY_A of the VPN client (A), the authentication/access authorization control means uses the public key to verify the signature SIG_A, thereby proving the identity of the VPN client (A) having the private key PRIVATEKEY_A corresponding to the public key PUBLICKEY_A. By inputting thereto a signature SIG_B by a private key PRIVATEKEY_B and a public key PUBLICKEY_B and verifying the signature SIG_B, the authentication/access authorization control means proves the identity of the VPN gateway unit (B) having the private key PRIVATEKEY_B. Similarly, by inputting thereto a signature SIG_D by a private key PRIVATEKEY_D and a public key PUBLICKEY_D and verifying the signature SIG_D, the authentication/access authorization control means proves the identity of the VPN client (D) having the private key PRIVATEKEY_D.

The above-mentioned authentication/access authorization control means 1042 controls the authorization of access of the VPN client unit (A) 101 and the VPN client unit (C) 102 to the VPN gateway unit (B) 103 by the SPKI scheme. In the case of controlling the authorization of access of the VPN client unit (A) 101 to the VPN gateway unit (B) 103, the authentication/access authorization control means inputs thereto a DNS query QUERY, a signature SIG_A and an access control list (ACL) for retrieving the IP address IPADDRESS_B, uses them as data values to execute calculations based on the 5-tuple reduction operation rules and/or 4-tuple reduction operation rules defined in the SPKI-related non-patent documents 4 and 5, and outputs the operation results. In the case of controlling the authorization of access of the VPN client unit (D) 102 to the VPN gateway unit (B) 103, the authentication/access authorization control means inputs thereto a DNS query QUERY, a signature SIG_D, a certificate CERT defined in the SPKI-related non-patent documents 4 and 5, and an access control list (ACL), then executes calculations based on the 5-tuple reduction operation rules and/or the 4-tuple reduction operation rule defined in the SPKI-related non-patent documents 4 and 5, and outputs the operation results. The operation results will be described concretely later on with reference to FIG. 10.

The above-mentioned key generating means 1044 generates a common key KEY_AB that is used for authentication in an IKE phase 1 between the VPN client unit (A) 101 and the VPN gateway unit (B) 103, or KEY_DB that is used for authentication in an IKE phase 1 between the VPN client unit (D) 102 and the VPN gateway unit (B) 103.

The VPN client unit (A) 101 possesses a function of issuing a authority delegation certificate CERT to the VPN client unit (D) 102 by. In the SPKI-related non-patent documents 4 and 5, there are defined grammar for two kinds of certificates, i.e., Authorization Certificate and Name Certificate. In this embodiment the certificate CERT is limited only to the authorization certificate for the sake of brevity.

FIG. 11 shows a concrete example of the certificate CERT in this embodiment. According to the SPKI-related non-patent documents 4 and 5, the authorization certificate is data signed with a private key of the issuer which data will hereinafter be referred to as certificate information INFO), the data being composed of: an issuer field that defines the public key uniquely corresponding to a private key of the issuer, or the hash value of the public key; a subject field that defines the public key uniquely corresponding to a private key of the authorizer, i.e., the VPN client (D) in this case, or the hash value of the public key; a tag field containing a character string that defines the contents of authorization; a delegation field containing a character string that defines whether or not to authorize the delegation of authority; and a validity field containing a character string that defines the validity interval of the authorization certificate.

Based on this definition, the value of the issuer field in the certificate information INFO of the certificate CERT in this embodiment is defined as the hash value HASH_A of the public key PUBLICKEY_A of the issuer of the certificate information INFO, or of the public key PUBLICKEY_A obtained by an arbitrary hashing algorithm. The value of the subject field is defined as the hash value HASH_D of the public key PUBLICKEY_D of the authorize, or of a public key PUBLICKEY_D obtained by an arbitrary hashing algorithm. The value of the tag field is data for permitting a DNS query for retrieving the IP address IPADDRESS_B of the VPN gateway unit (B) 103; the data contains the hash value HASH_B of the public key PUBLICKEY_B of the VPN gateway unit (B) 103, or of a public key PUBLICKEY_B obtained by an arbitrary hashing algorithm. The value of the delegation field is defined as a character string "propagate" defined in non-patent document 4. On the other hand, since the value of the validity field has no direct bearing on the present invention, no value is defined. The certificate information INFO is signed with the private key PRIVATEKEY_A.

Referring next to FIG. 2, the general outline of the operation of the FIG. 1 system will be described. During entry (storage) of the access control (ACL) the VPN gateway unit (B) 103 sends its public key PUBLICKEY_B (or its hash value HASH_B) to the mediating apparatus (S) 104 (step S1). The mediating apparatus (S) 104 stores the public key PUBLICKEY_B (or its hash value HASH_B) and the access control list (ACL).

In the case of connecting a remote VPN from the VPN client unit (A) 101 to the communication unit (C) 111 via the VPN gateway unit (B) 103 in an IPsec tunnel mode, the VPN client unit (A) 101 sends the public key PUBLICKEY_A and the public key PUBLICKEY_B (or their hash values HASH_A and HASH_B) to the mediating apparatus (S) 104 to request it to retrieve the IP addresses of the VPN gateway unit (B) 103 and the communication unit (C) (step S2).

The mediating apparatus (S) 104 executes access authorization control of the VPN client unit (A) 101 by the SPKI scheme, and in the case of authorizing access, it searches the domain name server (DNS) 105 to obtain the IP address IPADDRESS_B assigned to the VPN gateway unit (B) 103 (step S3). Then the mediating apparatus (S) 104 refers to the access control (ACL) to obtain the private IP address IPADDRESS_C assigned to the communication unit (C) 111 connected to LAN 110 that is placed under the management of the VPN gateway unit (B) 103. Then the mediating apparatus (S) 104 generates a common key KEY_AB that is used for mutual authentication of the VPN client unit (A) 101 and the VPN gateway unit (B) 103. Then the mediating apparatus (S) 104 uses the public key PUBLICKEY_A of the VPN client unit (A) 101 to encrypt the communication channel between the mediating apparatus (S) 104 and the VPN client unit (A) 101, and sends the IP addresses IPADDRESS_B and IPADDRESS_C and the common key KEY_AB to the VPN client unit (A) 101 over the encrypted communication channel (step S4). Then the mediating apparatus (S) 104 uses the public key PUBLICKEY_B of the VPN gateway unit (B) 103 to encrypt the communication channel between the mediating apparatus (S) 104 and the VPN gateway unit (B) 103, and sends the IP address IPADDRESS_A and the common key KEY_AB to the VPN gateway unit (B) 103 over the encrypted communication channel (step S5). Thus the VPN client unit (A) 101 and the VPN gateway unit (B) 103 are enabled to carry out communications between them with security by use of the common key KEY_AB. This embodiment uses the IPsec tunnel mode as a tunneling protocol between the VPN client units (A) 101 and the VPN gateway unit (B) 103, and the common key as information that is sent from the mediating apparatus (S) 104 to them for their mutual authentication. Other protocols such as L2TP and PPTP may be used as the tunnel protocol, and the mutual authentication information may also be ID, a password, a common secret, an SPKI authorization certificate, or similar information of other means.

In the case of delegating to the VPN client unit (D) 102 the authority for retrieving the IP address of the VPN gateway unit (B) 103, the VPN client unit (A) 101 sends a certificate CERT to the VPN client unit (D) 102 by the SPKI scheme (step S6). The VPN client unit (D) 102 sends its public key PUBLICKEY_D and the certificate CERT, and the public key PUBLICKEY_B (or its hash value HASH_B) to the mediating apparatus (S) 104 to make a request for retrieval of the IP addresses of the VPN gateway unit (B) 103 and the communication unit (C) (step S7). The mediating apparatus (S) 104 exercises the access authorization control for the VPN client unit (D) 102 by the SPKI scheme, and in the case of authorizing access, the mediating apparatus searches the domain name server (DNS) 105 to obtain the IP address IPADDRESS_B assigned to the VPN gateway unit (B) 103 (step S8). Then the mediating apparatus (S) 104 refers to the access control list (ACL) to obtain the private IP address IPADDRESS_C of the communication unit (C) 111 connected to LAN 110 that is placed under the management of the VPN gateway unit (B) 103. Then the mediating apparatus (S) 104 generates a common key KEY_DB that is used for mutual authentication between the VPN gateway unit (B) 103 and the VPN client unit (D) 102. Then the mediating apparatus (S) 104 uses the public key PUBLICKEY_D of the VPN client unit (D) 102 to encrypt the communication channel between the mediating apparatus (S) 104 and the VPN client unit (D) 102, and sends the IP addresses IPADDRESS_B and IPADDRESS_C and the common key KEY_DB to the VPN client unit (D) 102 over the encrypted communication channel (step S9). Then the mediating apparatus (S) 104 uses the public key PUBLICKEY_B of the VPN gateway unit (B) 103 to encrypt the communication channel between the mediating apparatus (S) 104 and the VPN gateway unit (B) 103, and sends the IP address IPADDRESS_D and the common key KEY_DB to the VPN gateway unit (B) 103 (step S10). Thus the VPN client unit (D) 102 and the VPN gateway unit (B) are enabled to carry out secure communications between them by use of the common key KEY_DB.

Up to this point the description has been given of the configuration of each unit and apparatus of the FIG. 1 system and the general outline of its entire operation, but no detailed description will be given of the IP address management and name resolution methods in the domain name server (DNS) 105, the method of encryption of the communication channel by the IPsec transport mode or tunnel mode, the method of generating the common keys KEY_AB and KEY_DB, and the signature verification method using public keys because these methods are well-known to those skilled in the art. Besides, in the case of using the name certificate as well as the authorization certificate, too, the access authorization control by the SPKI scheme can be implemented by the same method as that used in this embodiment; therefore, no detailed description will be made.

A detailed description will be given below of the access control list (ACL) storage procedure, the acquisition of the IP address, the generation of the common key, and the procedure for sending the IP address and the common key. Referring first to FIG. 5, the procedure for storing the access control list (ACL) in the mediating apparatus (S) will be described in detail. Incidentally, it is assumed in this embodiment that the access control list is retained and managed in the VPN gateway unit (B) 103 itself.

The VPN gateway unit (B) 103 and the mediating apparatus (S) 104 are connected in the IPsec transport mode (step 1001). By this, the communication channel between the VPN gateway unit (B) 103 and the mediating apparatus (S) 104 is encrypted. The VPN gateway unit (B) 103 sends over the encrypted communication channel the public key PUBLICKEY_B and the SPKI-formatted access control list (ACL) (FIG. 8) (step 1002). The mediating apparatus (S) 104 receives the public key PUBLIVKEY_B and the access control list (ACL) sent from the VPN gateway unit (B) 103, and stores the received public key PUBLICKEY_B and access control list (ACL) in association with each other (step 1003). The VPN gateway unit (B) 103 and the mediating apparatus (S) 104 are disconnected from each other (step 1004).

Incidentally, in the case where a VPN gateway management unit (M) 112 is provided which has a right of managing the access control list (ACL) for the above-mentioned VPN gateway unit (B) 103, the processing by the gateway unit (B) 103 in the access control list (ACL) entering procedure is performed entirely by the VPN gateway management unit (M) 112.

Figure 6:
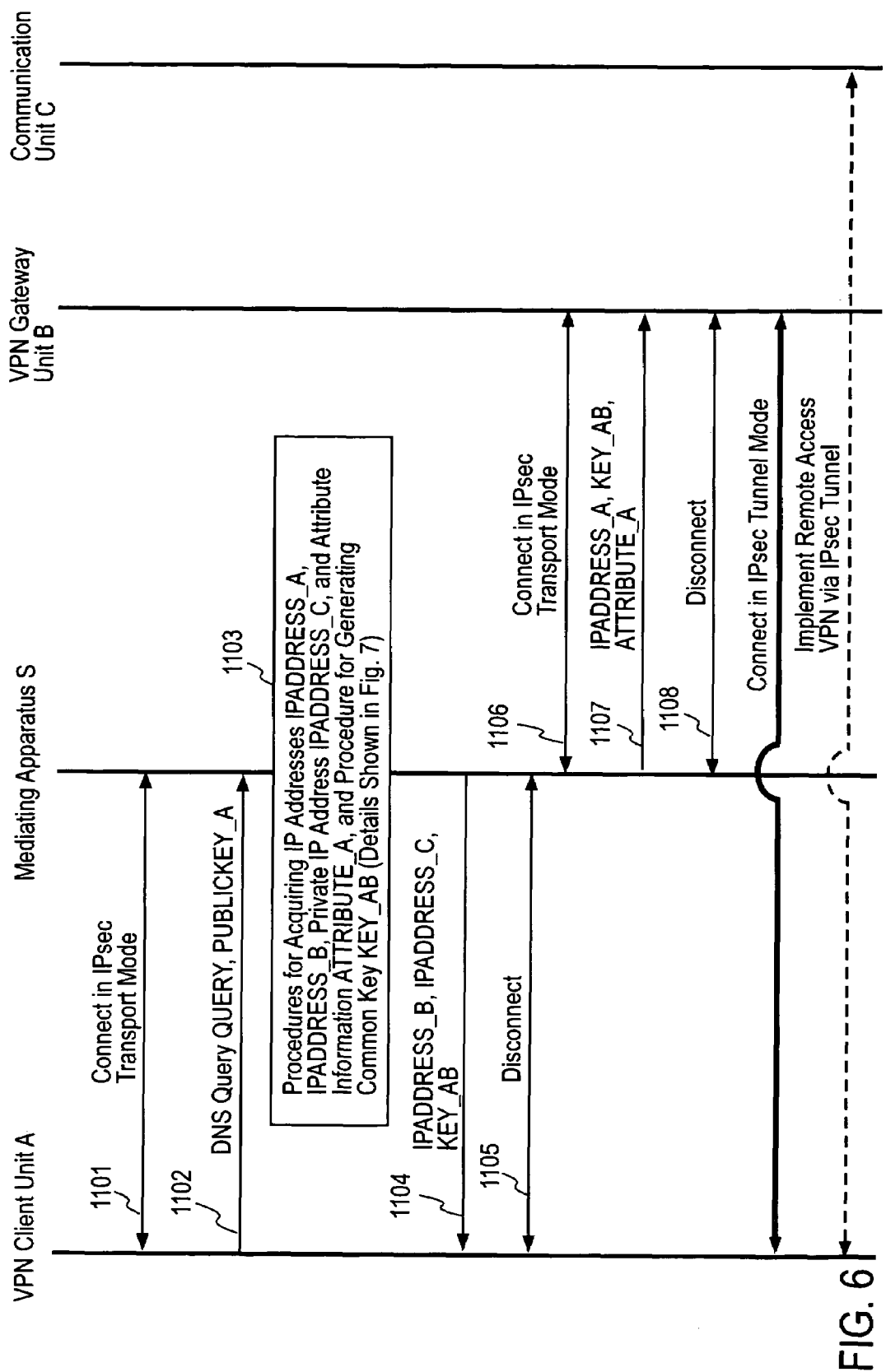
[FIG. 6] is a diagram showing the procedure for sending an IP address and a common key in the first embodiment of the present invention.
Figure 7:
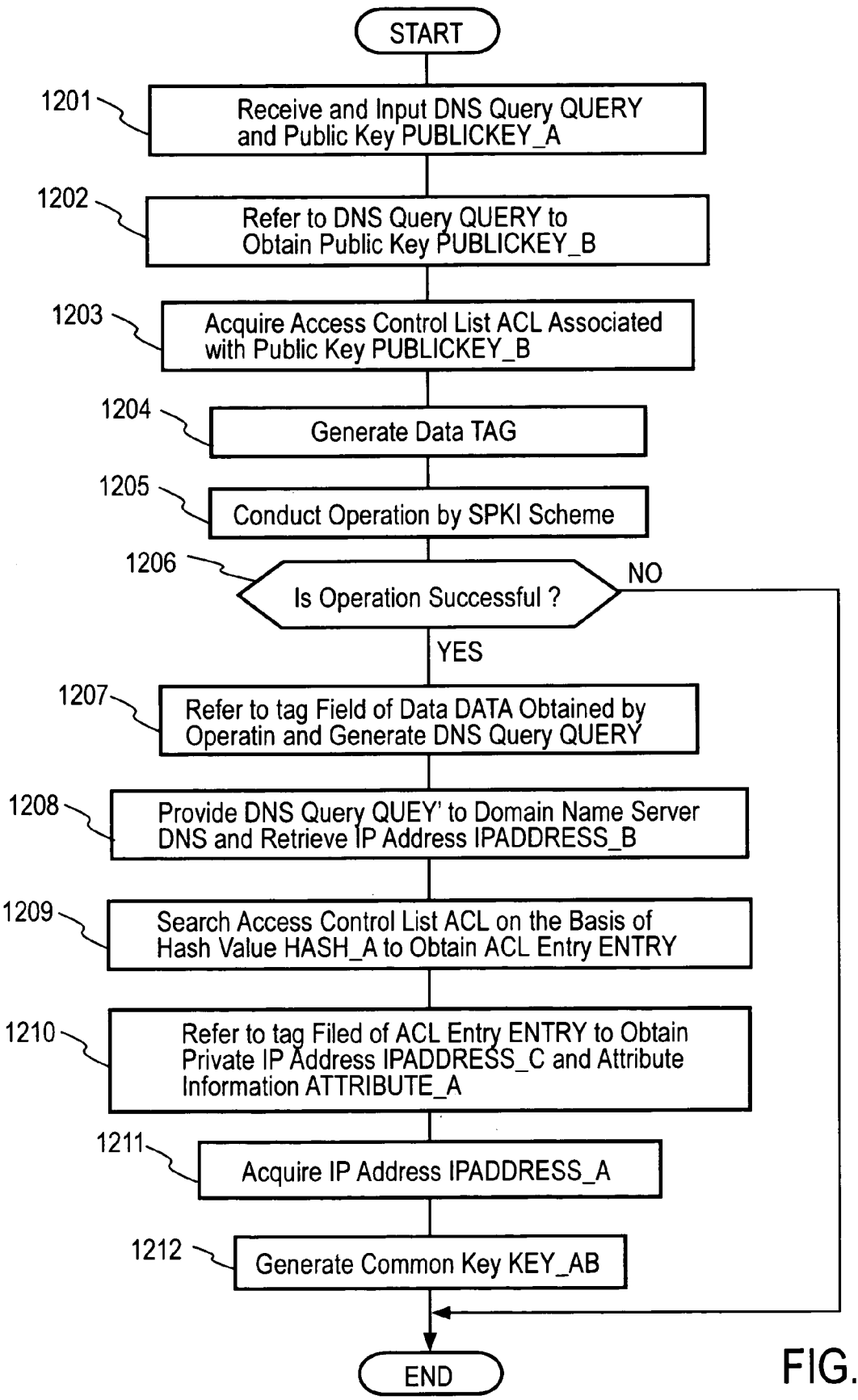
[FIG. 7] is a detailed flowchart showing an IP address acquiring procedure and a common key generating procedure in the mediating apparatus in the first embodiment of the present invention.

Referring next to FIGS. 6 and 7, a description will be given of the procedure by which the mediating apparatus (S) 104: generates the common key KEY_AB between the VPN client unit (A) 101 and the VPN gateway unit (B) 103; sends to the VPN client unit (A) 101 the IP address IPADDRESS_B assigned to the VPN gateway unit (B) 103, the private address IPADDRESS_C assigned to the communication unit (C), and the common key KEY_AB; and sends to the VPN gateway unit (B) 103 the IP address IPADDRESS_A assigned to the VPN client unit (A) 101, its attribute information ATTRIBUTE_A, and the common key KEY_AB.

In FIG. 6, the VPN client unit (A) 101 and the mediating apparatus (S) 104 are connected to each other in the IPsec transport mode (step 1101). In other words, the communication channel between the VPN client unit (A) 101 and the mediating apparatus (S) 104 is encrypted. The VPN client unit (A) 101 sends over the encrypted communication channel a DNS query QUERY containing the public key PUBLICKEY_B of the VPN gateway unit (B) 103 and the public key PUBLICKEY_A of the VPN client unit (A) 101 to the mediating apparatus (S) 103 (step 1102).

The mediating apparatus (S) 104 acquires the IP address IPADDRESS_A assigned to the VPN client unit (A) 101, the IP address IPADDRESS_B assigned to the VPN gateway unit (B) 103, the private address IPADDRESS_C assigned to the communication unit (C) 111 connected to LAN 110 placed under the management of the VPN gateway unit (B) 103, and the attribute information ATTRIBUTE_A of the VPN client unit (A) 101, and generates the common key KEY_AB that is used authentication by IKE or the like between the VPN client unit (A) 101 and the VPN gateway unit (B) 103 (step 1103). FIG. 7 is a detailed flowchart of step 1103.

In FIG. 7, the mediating apparatus (S) 104 receives and inputs thereto the DNS query QUERY and public key PUBLICKEY_A sent from the VPN client unit (A) 101 (step 1201). Then the mediating apparatus refers to the input DNS query QUERY to fetch therefrom the public key PUBLICKEY_B (step 1202). Then the mediating apparatus uses the fetched public key PUBLICKE_B to obtain the access control list (ACL) associated with the public key (step 1203). The access control list (ACL) has the format shown in FIG. 8. Next, the mediating apparatus generates data TAG of the format shown in FIG. 9 by use of the DNS query QUERY input thereto in step 1201 (step 1204).

The mediating apparatus (S) 104 uses the public key PUBLICKEY_A input thereto in step 1201, the data TAG generated in step 1204, and the access control list (ACL) acquired in step 1203 to conduct an operation, for instance, based on the reduction operation rules defined in non-patent documents 4 and 5 (step 1205), thereby deciding whether the mediating apparatus succeeds in the operation or not (step 1206). When the mediating apparatus fails in the operation, it discontinues processing at this point in time.

Only when it is decided in step 1206 that the mediating apparatus (S) 104 has succeeded in the operation, it outputs operation-result data DATA of the format shown in FIG. 10. The operation-result data DATA shown in FIG. 10 is data of the 5-tuple format defined in non-patent documents 4 and 5. Only when the ACL entry in which the value of the subject field of the operation-result data DATA completely matches the SHA-1 algorithm-based hash value HASH_A of the public key PUBLICKEY_A received in step 1201 is contained in the access control list (ACL) obtained in step 1203, the tag field of data DATA in FIG. 10 contains a character string that completely matches the data TAG in FIG. 9.

The mediating apparatus (S) 104 refers to the tag field of the output data DATA of FIG. 10, and generates a DNS query QUERY' (step 1207). Then the mediating apparatus presents the DNS query QUERY' to the domain name server (DNS) 105, and retrieves therefrom the IP address IPADDRESS_B (step 1208). Then the mediating apparatus searches the access control list ACL on the basis of the hash value HASH_A of the public key PUBLICKEY_A to obtain an (ACL) entry ENTRY containing, in its subject field, a character string which completely matches the hash value HASH_A (step 1209). Then the mediating apparatus refers to the tag field of the ACL entry EBTRY obtained in step 1209, and obtains the private IP address IPADDRESS_C and the attribute information ATTRIBUTE_A (step 1210). Then the mediating apparatus obtains the IP address IPADDRESS_A of the VPN client unit (A) 101 (step 1211). This is followed by the generation of the common key KEY_AB (step 1212).

Turning back to FIG. 6, the mediating apparatus (S) 104 sends the IP address IPADDRESS_B and the private IP address IPADDRESS_C obtained as mentioned above and the generated common key KEY_AB to the VPN client unit (A) 101 over the communication channel encrypted in step 1101 (step 1104). Then the client unit (A) 101 and the mediating apparatus (S) 104 are disconnected from each other (step 1105).

Next, the VPN gateway unit (B) 103 and the mediating apparatus (S) 104 are connected to each other in the IPsec transport mode (step 1106). That is, the communication channel between the VPN gateway unit (B) 103 and the mediating apparatus (S) 104 is encrypted. Then the mediating apparatus (S) 104 sends the previously acquired IP address IPADDRESS_A and attribute information ATTRIBUTE_A and the previously generated common key KEY_AB to the VPN gateway unit (B) 103 over the communication channel encrypted in step 1106 (step 1107). Then the VPN gateway unit (B) 103 and the mediating apparatus (S) 104 are disconnected from each other (step 1108).

Thereafter, the remote-access VPN from the client unit (A) 101 to the communication unit (C) 111 is implemented in the IPsec tunnel mode via the VPC gateway unit (B) 103 as depicted in FIG. 2; but no detailed description will be given of this operation.

Next, a description will be given below the procedure by which the VPN client unit (A) 101 issues the certificate CERT and passes its issued certificate CERT to the VPN client unit (D) 102. Incidentally, no flowchart will be shown.

(1) The VPN client unit (A) 101 generates the certificate information INFO on the certificate CERT in conformity to the grammar defined in the SPKI scheme. FIG. 11 shows an example of the certificate CERT in this embodiment. In FIG. 11, the value of the issuer field in the certificate information INFO is defined as the hash value HASH_A of the public key PUBLICKEY_A that is obtained by an arbitrary hashing algorithm. And the value of the subject field is defined as an SHA-1 algorithm-based hash value HASH_D of the public key PUBLICKEY_D. Further, the value of the tag field is defined as the IP address IPADDRESS_B assigned to the VPN gateway unit (B). The value of the delegation field is defined as the character string "propagate" defined in non-patent document 5. On the other hand, the value of the validity field can be defined as an arbitrary value because it is not directly related to the present invention.

(2) The VPN client unit (A) 101 issues the certificate CERT by signing the data generated in (1) through use of the private key PRIVATEKEY_A.

(3) The VPN client unit (A) 101 sends the certificate CERT issued in (2) to the VPN client unit (D) 102 by arbitrary means.

(4) The VPN client unit (D) 102 receives and stores the certificate CERT sent in its entirety from the VPN client unit (A) 101 by arbitrary means.

The procedure, by which the mediating apparatus (S) 104: generates the common key KEY_DB that is used for authentication by IKE or the like between the VPN client unit (D) 102 and the VPN gateway unit (B) 103; then sends the IP address IPADDRESS_B, the private IP address IPADDRESS_C and the common key KEY_DB to the VPN client unit (D) 102; and sends the IP address IPADDRESS_D assigned to the VPN client unit (D) 102, the attribute information ATTRIBUTE_A of the VPN client unit(A) 101, and the common key KEY_DB to the VPN gateway unit (B) 103, can be performed in the same manner as that of the procedure described previously with reference to FIGS. 6 and 7 by which the mediating apparatus (S) 104: generates the common key KEY_AB between the VPN client unit (A) 101 and the VPN gateway unit (B) 103; sends the IP address IPADDRESS_B, the private IP address IPADDRESS_C and the common key KEY_AB to the VPN client unit (A) 101; and sends the IP address IPADDRESS_A, the attribute information ATTRIBUTE_A and the common key KEY_AB to the VPN gateway unit (B) 103.

Thus, the remote-access VPN can also be implemented from the client unit (D) 102 to the communication unit (C) 111 via the VPN gateway unit (B) 103 in the IPsec tunnel mode as depicted in FIG. 2.

As described above, in this embodiment, the mediating apparatus (S) 104 stores the access control list (ACL) sent from the VPN gateway unit (B) 103, thereby storing the private IP address IPADDRESS_C assigned to the communication unit (C) 111. This enables the mediating apparatus (S) 104 to learn the private IP address IPADDRESS_C assigned to the communication unit (C) 111 connected to the local area network (LAN) 110 that the VPN gateway unit (B) 103 knows. Accordingly, the VPN client unit (A) 101 can learn the private IP address IPADDRESS_C necessary for the remote-access VPN to the communication unit (C) 111 via the VPN gateway unit (B) 103 in the IPsec tunnel mode, by putting a query to the mediating apparatus (S) 104 about it prior to implementation of the remote-access VPN.

And, in this embodiment the mediating apparatus (S) 104 generates the common key KEY_AB, and sends the common key KEY_AB to both of the VPN client unit (A) 101 and the VPN gateway unit (B) 103. As the result of this, the VPN client unit (A) 101 and the VPN gateway unit (B) 103 can receive the common key KEY_AB. Accordingly, the VPN client unit (A) 101 and the VPN gateway unit (B) 103 can share online the common key KEY_AB that is used for authentication in the IKE phase 1.

And, in this embodiment, the mediating apparatus (S) 104 authenticates the VPN gateway unit (B) 103, and only when the authentication is successful, the mediating apparatus (S) 104 stores the private IP address IPADDRESS_C of the communication unit (C) 111 sent from the VPN gateway unit (B) 103. This enables the mediating apparatus (S) 104 to store the private IP address IPADDRESS_C sent from a non-masqueraded VPN gateway unit (B) 103. Accordingly, the VPN client unit (A) 101 can learn the private IP address IPADDRESS_C sent from a valid VPN gateway unit (B) 103.

And, in this embodiment, the mediating apparatus (S) 104 encrypts the communication channel between it and the VPN gateway (B) 103 in the operation of the mediating apparatus (S) 104 that authenticates the VPN gateway unit (B) 103 and stores the private IP address IPADDRESS_C of the communication unit (C) 111 sent from the VPN gateway unit (B) 103 only when the authentication is successful. This ensures that the mediating apparatus (S) 104 receives the private IP address IPADDRESS_C of the communication unit (C) 111 sent from the VPN gateway unit (B) 103 without tampering and eavesdropping of the IP address. Accordingly, the VPN client unit (A) 101 can learn a valid private IP address IPADDRESS_C of the communication unit (C) 111 sent from a valid VPN gateway unit (B) 103. Besides, the VPN gateway unit (B) 103 can send the valid private IP address IPADDRESS_C of the communication unit (C) 111 to the mediating apparatus (S) 104 without allowing it to become known to an indefinite number of general public.

And, in this embodiment, the mediating apparatus (S) 104: authenticates the VPN client unit (A) 101; and, only when the authentication is successful, obtains the IP address IPADDRESS_B assigned to the VPN gateway unit (B) 103 from the domain name server (DNS) 105 by putting thereto a query about it, then generates the common key KEY_AB, and sends all of the thus obtained IP address IPADDRESS_B, the IP address IPADDRESS_C assigned to the communication unit (C) 111, and the generated common key KEY_AB to the VPN client unit (A) 101. As a result, unless the VPN client unit (A) 101 is masqueraded, the mediating apparatus (S) 104 is allowed to send all of the IP address IPADDRESS_B assigned to the VPN gateway unit (B) 103, the private IP address IPADDRESS_C assigned to the communication unit (C) 111, and the common key KEY_AB to the VPN client unit (A) 101. Accordingly, only the valid VPN client unit (A) 101 is allowed to implement the remote-access VPN to the communication unit (A) 111 via the VPN gateway unit (B) 103 in the IPsec tunnel mode.

And, in this embodiment, the mediating apparatus (S) 104: decides whether or not the VPN client unit (A) 101 has the right to retrieve the IP address IPADDRESS_B assigned to the VPN gateway unit (B) 103; and only when the VPN gateway unit has the right, obtains the IP address IPADDRESS_B assigned to the VPN gateway unit (B) 103 from the domain name server (DNS) 105 by putting thereto a query, then generates the common key KEY_AB, and sends all of the thus obtained IP address IPADDRESS_B, the IP address IPADDRESS_C assigned to the communication unit (C) 111, and the generated common key KEY_AB to the VPN client unit (A) 101. This enables the mediating apparatus (S) 104 to send all of the IP address IPADDRESS_B assigned to the gateway unit (B) 103, the private IP address IPADDRESS_C assigned to the communication unit (C) 111, and the common key KEY_AB only to the VPN gateway unit (B) 103 and the VPN client unit (A) 101 having the authority of access to the communication unit (C) 111. Accordingly, it is possible to protect the VPN gateway unit (B) 103 and the communication unit (C) 111 from the remote-access VPN in the IPsec tunnel mode from an indefinite number of general public.

And, in this embodiment, the mediating apparatus (S) 104 encrypts the communication channel between the mediating apparatus (S) 104 and the VPN client unit (A) 101. Hence, the mediating apparatus (S) 104 can send the IP address IPADDRESS_B assigned to the VPN gateway unit (B) 103, the private IP address IPADDRESS_C assigned to the communication unit (C) 111 and the common key KEY_AB to the VPN client unit (A) 101 without their tampering and eavesdropping. Accordingly, the VPN client unit (A) 101 can implement the remote-access VPN to the valid communication unit (C) 111 via the valid VPN gateway unit (B) 103 in the IPsec tunnel mode.

And, in this embodiment, the mediating apparatus (S) 104 authenticates the VPN gateway unit (B) 103, and only when the authentication is successful, it sends the IP address IPADDRESS_A assigned to the VPN client unit (A) 101, its attribute information ATTRIBUTE_A, and the common key KEY_AB to the VPN gateway unit (B) 103. As a result, unless the VPN gateway unit (B) 103 is masqueraded, the mediating apparatus (S) 104 can send the IP address IPADDRESS_A assigned to the VPN client unit (A) 101, its attribute information ATTRIBUTE_A, and the common key KEY_AB to the VPN gateway unit (B) 103. This produces an effect that the VPN client unit (A) 101 is allowed to implement the remote-access VPN to the communication unit (C) 111 via the valid VPN gateway unit (B) 103 in the IPsec tunnel mode.

And, in this embodiment, the mediating apparatus (S) 104 encrypts the communication channel between it and the VPN gateway (B) 103 in the operation of the mediating apparatus (S) 104 that authenticates the VPN gateway unit (B) 103 and sends the IP address IPADDRESS_A assigned to the VPN client unit (A) 101, its attribute information ATTRUBUTE_A, and the common key KEY_AB to the VPN gateway unit (B) 103 only when the authentication is successful. This ensures that the mediating apparatus (S) 104 sends all of the IP address IPADDRESS_A assigned to the VPN client unit (A). 101, its attribute information ATTRUBUTE_A, and the common key KEY_AB to the VPN gateway unit (B) 103 without their tampering and eavesdropping. Accordingly, the VPN gateway unit (B) 103 and the communication unit (C) 111 can implement the remote-access VPN to the valid VPN client unit (A) 101 in the IPsec tunnel mode.

And, in this embodiment, the mediating apparatus (S) 104 authenticates the VPN client unit (A) 101 and the VPN gateway unit (B) 103 by the SPKI scheme. This permits identity certification by signature verification, eliminating the need for sending a public key certificate from either of the VPN client unit (A) 101 and the VPN gateway unit (B) 103 to the mediating apparatus (S) 104. Accordingly, both of the VPN client unit (A) 101 and the VPN gateway unit (B) 103 can conceal their personal information from the mediating apparatus S.

And, in this embodiment, the VPN client unit (A) 101 issues the certificate CERT by the SPKI scheme and sends it to the VPN client unit (D) 102. Since this enables the VPN client unit (A) 101 to delegate to the VPN client unit (D) 102 a right to retrieve the IP address IPADDRESS_B assigned to the VPN gateway unit (B) 103, the VPN client unit (D) 102 can retrieve the IP address IPADDRESS_B assigned to the VPN gateway unit (B) 103. Further, the VPN client unit (D) 102 can obtain the private IP address IPADDRESS_C assigned to the communication unit (C) 111. Accordingly, the VPN client unit (D) 102 can also implement the remote-access VPN to the communication unit (C) 111 via the VPN gateway unit (B) 103 in the IPsec tunnel mode. Besides, the VPN gateway unit (B) 103 is capable of permitting implementation of the remote-access VPN from the VPN client unit (D) 102 without the need for adding information about the VPN client unit (D) 102 to the access control list (ACL). Hence, the VPN gateway unit (B) 103 reduces the cost for management such as editing of the access control list (ACL).

Incidentally, the placement of the hash value HASH_B of the public key PUBLICKEY_B and IPADDRESS_B under associated management of the domain name server (DNS) 105 shown in FIGS. 1 and 2 can also be achieved by a procedure by which the VPN gateway unit (B) 103 generates the hash value HASH_B of its public key PUBLICKEY_B, then enters the hash value HASH_B and its IP address IPADDRESS_B into the domain name server (DNS), and by changing DNS query in the procedure (step 1102) in FIG. 6 to a DNS query containing the hash value HASH_B of the public key PUBLICKEY_B by an arbitrary hashing algorithm.

And, in the access control list (ACL) in FIG. 8, the data TAG in FIG. 9, the operation result data DATA in FIG. 10 and the certificate CERT in FIG. 11, the hash value HASH_A may be calculated by use of an arbitrary hashing algorithm other than the SHA-1 algorithm. The value of the issuer field may be defined as the public key PUBLICKEY_A in place of the hash value HASH_A. Similarly, the value of the subject field may be defined as the public key PUBLICKEY_D in place of the hash value HASH_D. Even if these modifications are made, the same results as described above can be obtained with respect to the access control by conducting the operations in accordance with the reduction operation rules defined in the SPKI-related non-patent documents 4 and 5. No detailed description will be given of the format of the certificate CERT in the case of using a hashing algorithm other than the SHA-1 algorithm and the formats of the access control list ACL, the data DATA and the certificate CERT in the case of designating the public key to the issuer field and the subject field, because they are described in detail in the SPKI-related non-patent documents 4 and 5. With the modification, the procedure shown in FIG. 7 (step 1209) can obviously be performed by a procedure of presenting the public key PUBLICKEY_A to the access control list ACL to retrieve therefrom the ACL entry.

Further, the VPN client unit (A) 101 shown in FIG. 2 is assigned only the global IP address IPADDRESS_A, but an arbitrary private IP address in the local area network LAN may be dynamically assigned to the VPN client unit (A) 101 under instructions from the VPN gateway unit (B) 103 by using the methods set forth in patent document 4 and non-patent document 4 at the time of setting up the IPsec tunnel mode between the VPN client unit (A) 101 and the VPN gateway unit (B) 103. Moreover, an arbitrary IP private address in the local area network LAN may be assigned dynamically to the VPN client unit (A) 101 via the communication channel set up in the IPsec transport mode between the mediating apparatus (S) 104 and the VPN client unit (A) 101 under instructions from the mediating apparatus (S) 104 by use of such a method as set forth in patent document 3.

EMBODIMENT 2

Figure 12:
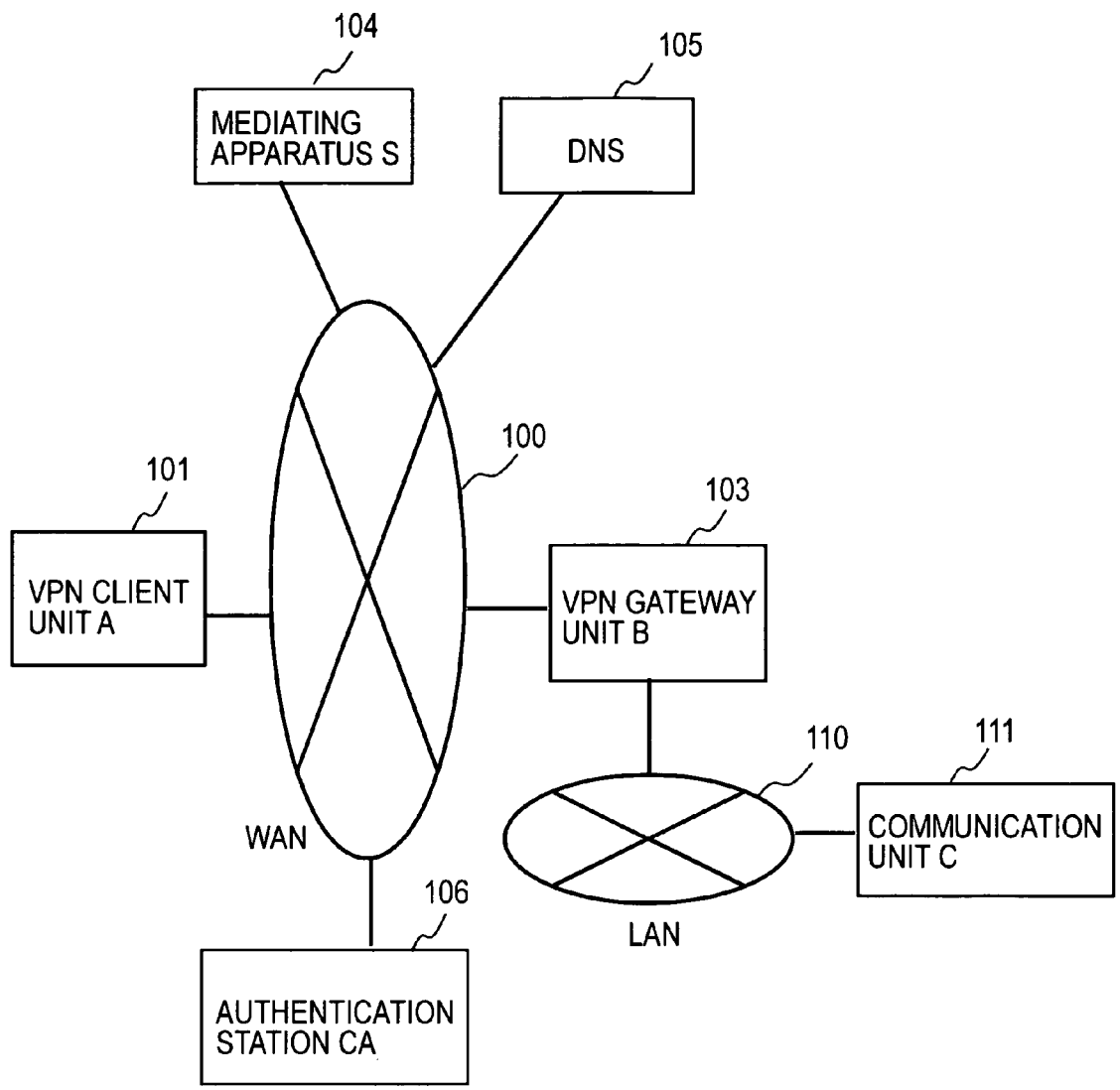
[FIG. 12] is a diagram illustrating a system configuration in a second embodiment of the present invention.

This embodiment further devises the certificate CERT, and provides the certificate CERT in the form of a 0.509-type public key certificate. The basic system configuration of this embodiment is the same as that of Embodiment 1, but an authentication station is required. FIG. 12 illustrates the general system configuration of this embodiment. In FIG. 12 the VPN client unit (A) 101, the VPN gateway unit (B) 103, an authentication station (CA) 106, the domain name server (DNS) 105, and the mediating apparatus (S) 104 are each connected to the network (WAN) 100 under IP (Internet Protocol) control.

Figure 13:
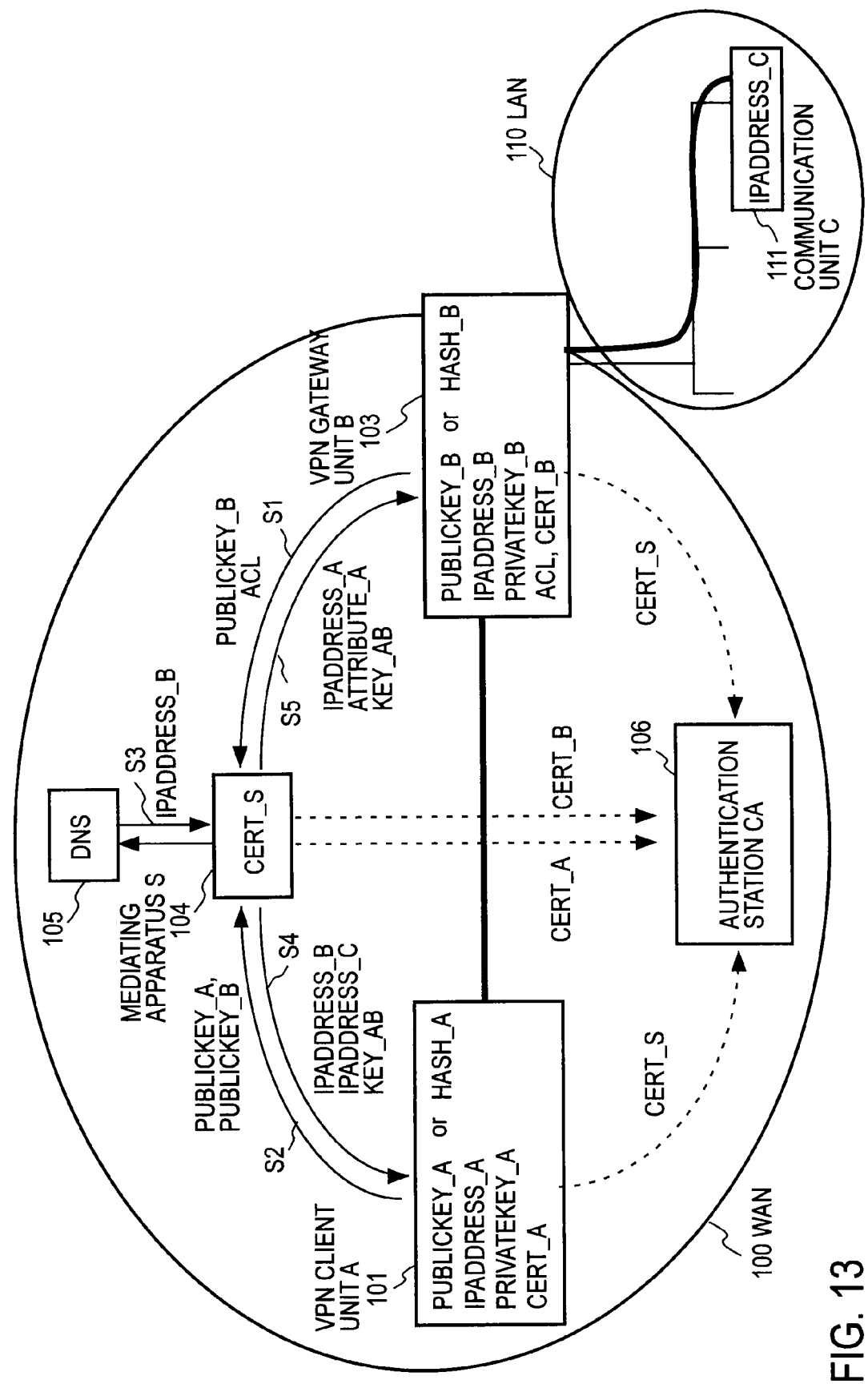
[FIG. 13] is a diagram for explaining the general outline of the operation of the second embodiment of the present invention.

FIG. 13 is a diagram for explaining the operation of the entire system in FIG. 12. The thick lines indicate the remote-access VPN in the IPsec tunnel mode, and the broken lines indicate presentation of the public key certificate CERT to the authentication station (CA) in the authentication in the IKE phase 1. In this embodiment, too, the host name of the VPN client unit (A) 101 is represented by the public key PUBLICKEY_A (or its hash value HASH_A), its IP address by IPADDRESS_A, the host name of the VPN gateway unit (B) 103 by the public key PUBLICKEY_B (or its hash value HASH_B), its IP address by IPADDRESS_B, and the private IP address of the communication unit (C) 111 by IPADDRESS_C.

The IP address IPADDRESS_A assigned to the VPN client unit (A) 101 and the IP address IPADDRESS_B assigned to the VPN gateway unit (B) 103 are both unique in the IP network (WAN) 100, and they are assigned by arbitrary means. The public key PUBLICKEY_B (or its hash value HASH_B) and the IP address IPADDRESS_B of the VPN gateway unit (B) 103 are uniquely associated with each other and placed under the management of the domain name server (DNS) 105. The private IP address IPADDRESS_C assigned to the communication unit 111 is unique only in the local area network (LAN) 110, and it is dynamically assigned by arbitrary means such as DHCP (Dynamic Host Configuration Protocol) or IPCP (PPP IP control protocol).

The VPN client unit (A) 101, the VPN gateway unit (B) 103, and the moderating apparatus (S) 104 each have means for encrypting the communication channel in the IPsec transport mode or IPsec tunnel mode. The private key of the public key PUBLICKEY_A is PRIVATEKEY_A, which is retained in the VPN client unit (A) 101. CERT_A is an X.509-format public key certificate containing the public key PUBLICKEY_A that pairs with the private key PRIVATEKEY_A, and it is signed with a private key PRIVATEKEY_R of the authentication station (CA) and retained in the VPN client unit (A) 101. A private key PRIVATEKEY_B of the public key PUBLICKEY_B is retained in the VPN gateway unit (B) 103. CERTB is an X.509-format public key certificate containing the public key PUBLICKEY_B that pairs with the private key PRIVATEKEY_B, and it is also signed with the private key PRIVATEKEY_R of the authentication station (CA) 106 and retained in the VPN gateway unit (B) 103. The authentication station (CA) 106 authenticates the public key certificate CERT_A of the VPN client unit (A) 101 and the public key certificate CERT_B of the VPN gateway unit (B) 103 by the PKI (Public Key Infrastructure) scheme. The access control list (ACL) is data that the private IP address IPADDRESS_C and the attribute information ATTRIBUTE_A of the VPN client unit (A) 101 are associated with a combination of the public key PUBLICKEY_A and the public key PUBLICKEY_B, and the list has the same structure as that shown in FIG. 8 and is retained in the VPN gateway unit (B) 103. A private key PRIVATEKEY_S is retained in the mediating apparatus (S) 104. CERT_S is an X.509-format public key certificate containing a public key PUBLICKEY_S that pairs with the private key PRIVATEKEY_S, and it is signed with the private key PRIVATEKEY_R of the authentication station (CA) 106 and retained in the mediating apparatus (S) 104.

The mediating apparatus is substantially the same in configuration as the mediating apparatus (S) 104 in Embodiment 1, but differs from the latter in that the authentication/access authorization control means 1042 authenticates the client unit (A) 101 and the gateway unit (B) by use of the public key certificates CERT_A and CERT_B of the client unit (A) and the gateway unit (B) signed by the authentication station (CA) 106. Therefore, no description will be given of the configuration of the mediating apparatus (S) 104 and, for the mediating apparatus (S) 104, reference will hereinafter be made to FIG. 3.

The IP address acquiring means 1043 retrieves the IP address IPADDRESS_B from the public key PUBLICKEY_B by the name resolution scheme called DNS scheme that is common in the Internet. The ACL storage means 1041 manages the access control list (ACL) in association with the public key PUBLICKEY_B. The authentication/access authorization control means 1042 presents the public key PUBLICKEY_A contained in the public key certificate CERT_A to the access control list ACL to search it, and outputs, as the search result, the private IP address IPADDRESS_C and the attribute information ATTRIBUTE_A uniquely associated with the combination of the public key PUBLICKEY_A and the public key PUBLICKEY_B. The key generating means 1044 generates the common key KEY_AB that is used for authentication in the IKE phase 1 between the VPN client unit (A) 101 and the VPN gateway unit (B) 103.

Next, a description will be given, with reference to FIG. 13, of the general outline of the operation of the FIG. 12 embodiment. At the time of entering (storage) of the access control list (ACL), the VPN gateway unit (B) 103 sends the public key PUBLICKEY_B (or its hash value HASH_B) and the access control list (ACL) to the mediating apparatus (S) 104 (step S1). The mediating apparatus (S) 104 stores the access control list (ACL) as the tables of FIGS. 4A and 4B in association with the public key PUBLICKEY_B (or its hash value HASH_B). In the case of implementing the remote-access VPN from the VPN client unit (A) 101 to the communication unit (C) 111 via the VPN gateway unit (B) 103 in the IPsec tunnel mode, the VPN client unit (A) 101 sends the public key PUBLICKEY_A and the public key PUBLICKEY_B (or its hash value HASH_B) to the mediating apparatus (S) 104 to make a request for retrieval of the IP addresses of the VPN gateway unit (B) 103 and the communication unit (C) 111 (step S2).

In the case where the authentication/access authorization control means 1042 executes the access authorization control for the VPN client unit (A) 101 by the PKI scheme for granting it access authorization, the mediating apparatus (S) 104 searches the domain name server (DNS) 105 and retrieves therefrom the IP address IPADDRESS_B assigned to the VPN gateway unit (B) 103 (step S3). The mediating apparatus (S) 104 refers to the access control list (ACL) to obtain therefrom the private IP address IPADDRESS_C and attribute information ATTRIBUTE_A of the communication unit (C) 111 connected to the LAN 110 placed under the management of the VPN gateway unit (B) 103. Furthermore, the mediating apparatus (S) 104 generates the common key KEA_B that is used for authentication between the VPN client unit (A) 101 and the VPN gateway unit (B) 103. And, the mediating apparatus (S) 104 encrypts the communication channel between the mediating apparatus (S) 104 and the VPN client unit (A) 101, through which it sends the IP addresses IPADDRESS_B, IPADDRESS_C and the common key KEY_AB to the VPN client unit (A) 101 (step S4). Moreover, the mediating apparatus (S) 104 encrypts the communication channel between the mediating apparatus (S) 104 and the VPN gateway unit (B) 103, through which it sends the IP address IPADDRESS_A, the attribute information ATTRIBUTE_A and the common key KEY_AB to the VPN gateway unit (B) 103 (step S5).

Up to this point the configuration of each unit and apparatus of the FIG. 12 system and the general outline of its operation have been described, but no detailed description will be given of the IP address management and name resolution methods in the domain name server (DNS) 105, the communication channel encryption method of by the IPsec transport mode or tunnel mode, the method of generating the common keys KEY_AB, and the method for authentication of the X.059-format public key certificates CERT_A and CERT_B, because these methods are well-known to those skilled in the art.

A detailed description will be given below of the access control list (ACL) storage procedure and the procedures for acquiring the IP addresses, generation of the common keys and sending of these IP addresses and common keys in Embodiment 2.

Figure 14:
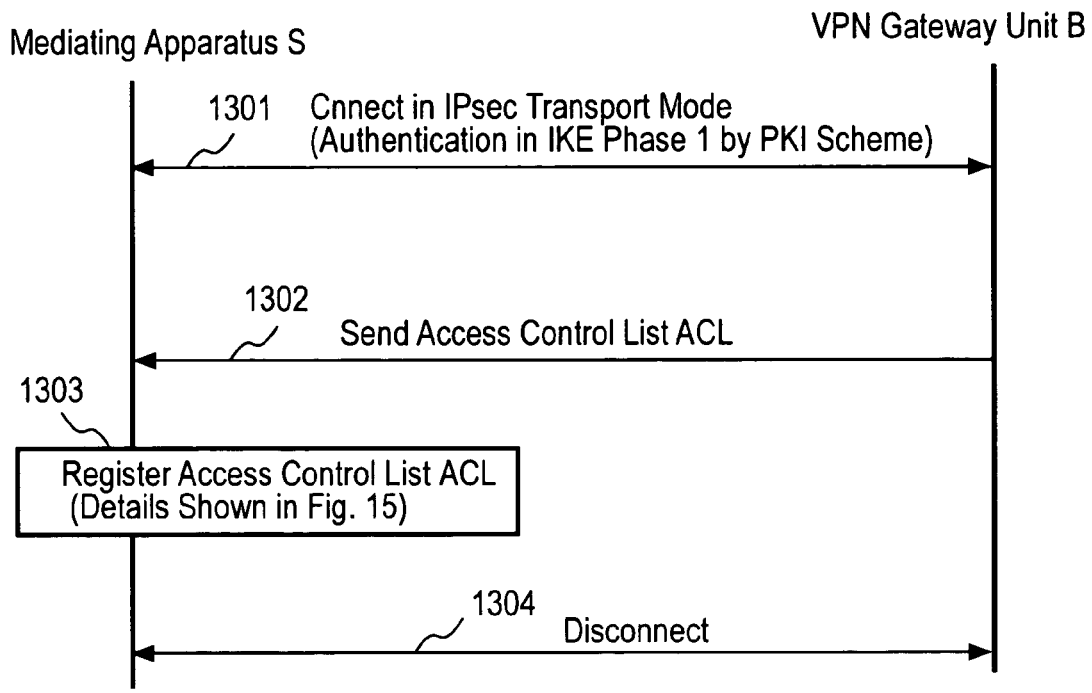
[FIG. 14] is a diagram showing access control ACL storage means in the second embodiment of the present invention.
Figure 15:
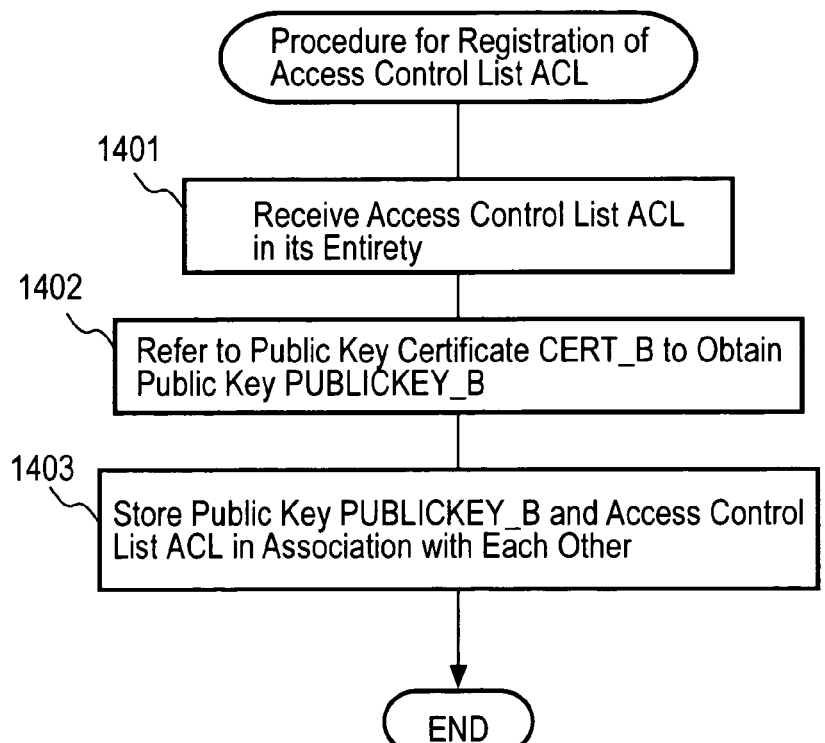
[FIG. 15] is a detailed flowchart showing access control list ACL storage procedure in the mediating apparatus in the second embodiment of the present invention.

Referring first to FIGS. 14 and 15, a description will be given of the procedure by which the access control list (ACL) retained in the VPN gateway unit (B) 103 is stored in the mediating apparatus (S) 104.

In FIG. 14, the VPN gateway unit (B) 103 and the mediating apparatus (S) 104 are connected with each other in the IPsec transport mode (step 1301). The authentication in the IKE phase 1 is performed by the PKI scheme; the VPN gateway unit (B) 103 sends the public key certificate CERT_B, and the mediating apparatus (S) 104 sends the public key certificate CERT_S. The VPN gateway unit (B) 103 puts a query to the authentication station (CA) 106 about the received public key certificate CERT_S to authenticate the validity of the public key certificate CERT_S by the PKI scheme. Similarly, the mediating apparatus (S) 104 puts a query to the authentication station (CA) about the received public key certificate CERT_B to authenticate the validity of the public key certificate CERT_B by the PKI scheme.

The VPN gateway unit (B) 103 sends the access control list (ACL) in its entirety over the communication channel encrypted in step 1301 (step 1302). The mediating apparatus (S) 104 enters thereinto the access control list (ACL) sent from the VPN gateway unit (B) 103 (step 1303). Thereafter, the VPN gateway unit (B) 103 and the mediating apparatus (S) 104 are disconnected from each other (step 1304).

FIG. 15 is a flowchart showing in detail the procedure by which the mediating apparatus (S) 104 enters thereinto the access control list (ACL). In the first place, the mediating apparatus (S) 104 receives the access control list (ACL) in its entirety sent from the VPN gateway unit (B) 103 (step 1401). Then the mediating apparatus refers to the public key certificate CERT_B used in the IKE authentication and obtains the public key PUBLICKEY_B (step 1402). Then the mediating apparatus stores the thus obtained public key PUBLICKEY_B and the access control list ACL received in step 1402 in association with each other (step 1403).

Figure 16:
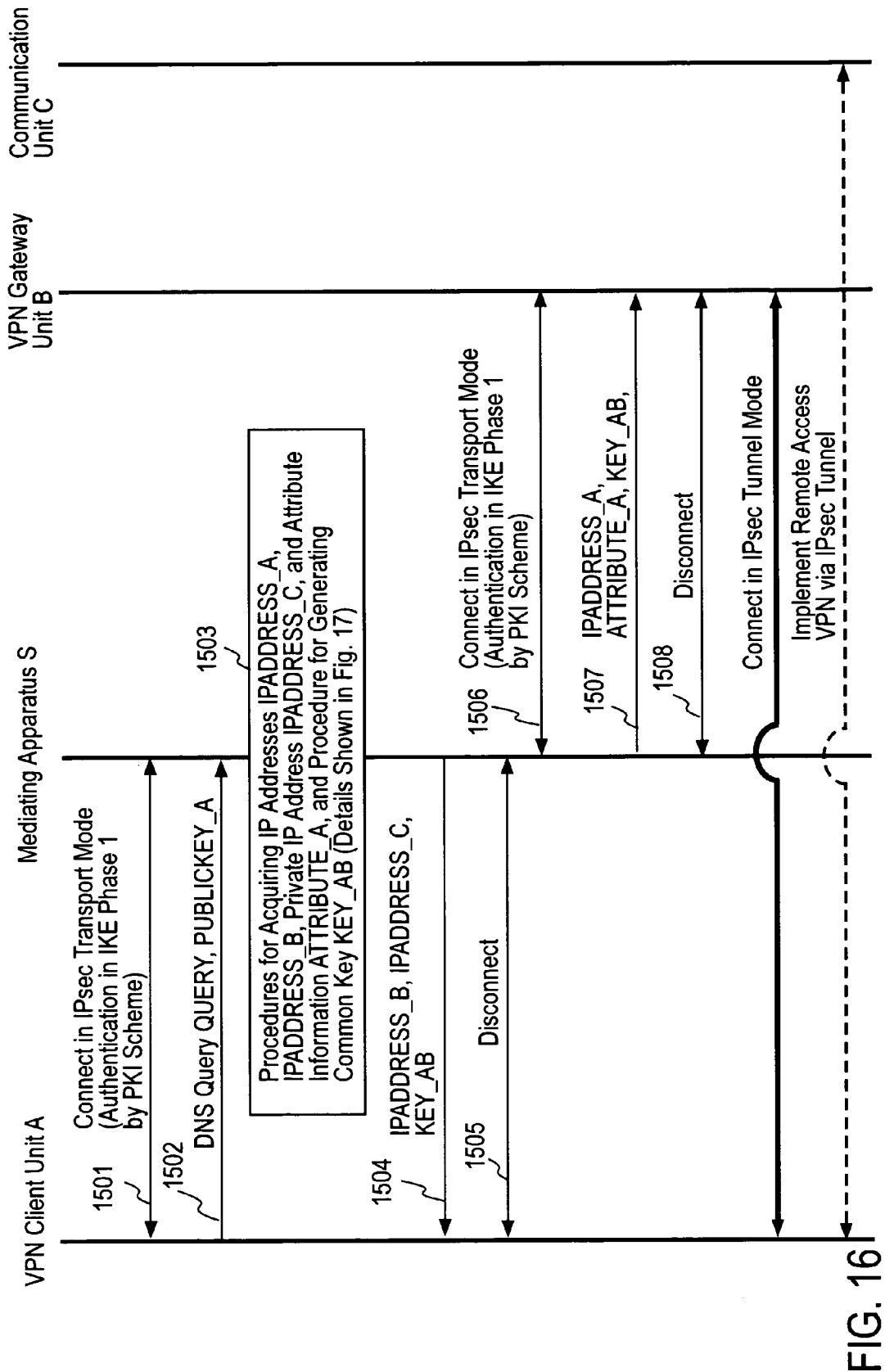
[FIG. 16] is a diagram showing IP address and common key distribution procedures in the second embodiment of the present invention.
Figure 17:
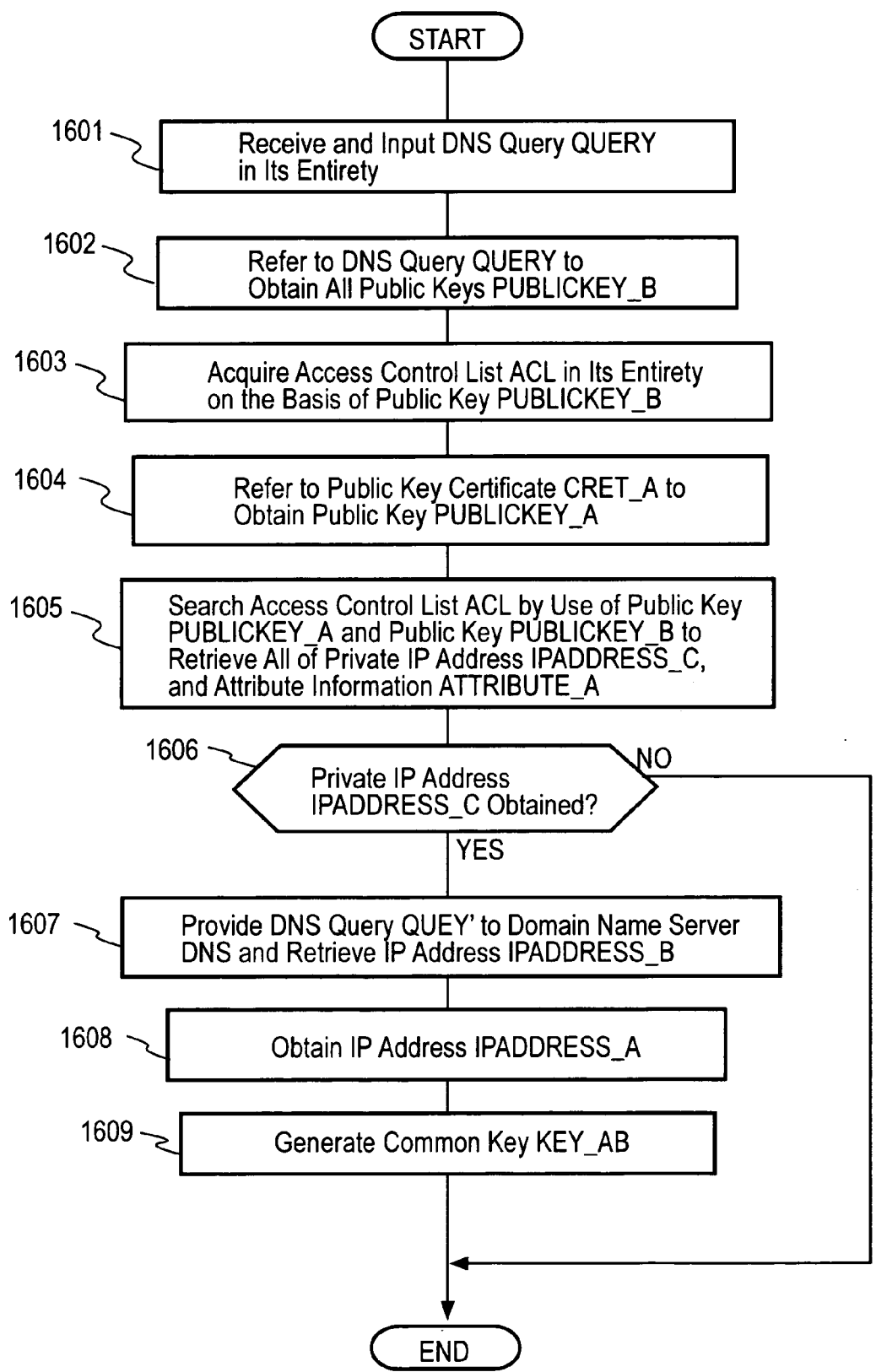
[FIG. 17] is a detailed flowchart showing an IP address acquiring procedure and a common key generating procedure in the mediating apparatus in the second embodiment of the present invention.

Referring next to FIGS. 16 and 17, a description will be given of the procedure by which the mediating apparatus (S) 104: generates the common key KEY_AB between the VPN client unit (A) 101 and the VPN gateway unit (B) 103; sends the IP address IPADDRESS_B assigned to the VPN gateway unit (B) 103, the private IP address IADDRESS_C and the common key KEY_AB to the VPN client unit (A) 101; and sends the IP address IPADDRESS_A assigned to the VPN client unit (A) 101, its attribute information ATTRIBUTE_A and the common key KEY_AB to the VPN gateway unit (B) 103.

In FIG. 16, the VPN client unit (A) 101 and the mediating apparatus (S) 104 are connected to each other in the IPsec transport mode (step 1501). The authentication in the IKE phase 1 is performed by the PKI scheme; the VPN client unit (A) 101 sends the public key certificate CERT_A; and the mediating apparatus (S) 104 sends the public key certificate CERT_S. The VPN gateway unit (A) 101 put a query to the authentication station (CA) 106 about the received public key certificate CERT_S to authenticate the validity of the public key certificate CERT_S by the PKI scheme. Similarly, the mediating apparatus (S) 104 puts a query to the authentication station (CA) about the received public key certificate CERT_A to authenticate the validity of the public key certificate CERT_A by the PKI scheme.

The VPN client unit (A) 101 sends the whole of the DNS query QUERY containing the public key PUBLICKEY_B of the VPN gateway unit (B) 103 over the communication channel encrypted in step 1501 (step 1502). The mediating apparatus (S) 104 acquires the IP address IPADDRESS_A assigned to the VPN client unit (A) 101, the IP address IPADDRESS_B assigned to the VPN gateway unit (B) 103 and the private IP address IPADDRESS_C assigned to the communication unit (C) 111 connected to LAN 110 placed under the management of the VPN gateway unit (B) 103, and generates the common key KEY_AB that is used for authentication by IKE or the like between the VPN client unit (A) 101 and the VPN gateway unit (B) 103 (step 1503). FIG. 17 is a flowchart showing step 1503 in detail.

In FIG. 17, the mediating apparatus (S) 104 first receives the DNS query in its entirety sent from the VPN client unit (A) 101 (step 1601). Then the mediating apparatus refers to the DNS query input thereto and acquires therefrom the public key KEY_B in its entirety (step 1602). Then the mediating apparatus uses the public key PUBLICKEY_B to acquire the whole of the access control list (ACL) associated therewith (step 1603). Then the mediating apparatus refers to the public key certificate CERT_A used for the IKE phase 1 authentication in step 1501 and acquires the public key PUBLICKEY_A in its entirety (step 1604). Then the mediating apparatus uses the public key PUBLICKEY_A to search the access control list (ACL) and acquires therefrom the private IP address IPADDRESS_C (step 1605). And the mediating apparatus decides that it has acquired the private IP address IPADDRESS_C (step 1606), and in the case where any IP addresses cannot be acquired, the procedure discontinued.

When having acquired the private IP address IPADDRESS_C, the mediating apparatus S presents the DNS query QUERY received in step 1601, to the domain name server (DNS) 105 to acquire therefrom the IP address IPADDRESS_B (step 1607). The mediating apparatus acquires the IP address IPADDRESS_A of the VPN client unit A (step 1608). This is followed by the generation of the common key KEY_AB (step 1609).

Turning back to FIG. 16, the mediating apparatus (S) 104 sends all of the IP address IPADDRESS_B obtained in step 1607, the private IP address IPAFFRESS_C obtained in step 1605 and the common key KEY_AB generated in step 1609 to the VPN client unit (A) over the communication channel encrypted in step 1501 (step 1504). This is followed by disconnecting the VPN client unit (A) 101 and the mediating apparatus (S) 104 from each other (step 1505).

Then the VPN gateway unit (B) 103 and mediating apparatus (S) 104 are connected to each other in the IPsec transport mode (step 1506) The authentication in the IKE phase 1 is performed by the PKI scheme; the VPN gateway unit (B) 103 sends the public key certificate CERT_B and the mediating apparatus (S) 104 sends the public key certificate CERT_S. The VPN gateway unit (B) 103 puts a query to the authentication station (CA) 106 about the received public key certificate CERT_S to authenticate the validity of the public key certificate CERT_S by the PKI scheme. Similarly, the mediating apparatus (S) 104 puts a query to the authentication station (CA) 106 about received the public key certificate CERT_B to authenticate its validity by the PKI scheme.

The mediating apparatus (S) 104 sends all of the attribute information ATTRIBUTE_A obtained in step 1605, the IP address IPADDRESS_A obtained in step 1608, and the common key KEY_AB generated in step 1609 to the VPN gateway unit (B) 103 over the communication channel encrypted in step 1506 (step 1507). This is followed by disconnecting the VPN gateway unit (B) 103 and the mediating apparatus (S) 104 from each other (step 1508).

As described above, in this embodiment, by storing the private IP address IPADDRESS_C assigned to the communication unit (C), sent thereto from the VPN gateway unit (B) 103, the mediating apparatus (S) 104 can learn the private IP address IPADDRESS_C assigned to the communication unit (C) 111 connected to the local area network (LAN) which is known only to the VPN gateway unit (B) 103. Accordingly, the VPN client unit (A) 101 can learn the private IP address IPADDRESS_C necessary for the remote-access VPN to the communication unit (C) 111 via the VPN gateway unit (B)

103 in the IPsec tunnel mode, by making putting a query to the mediating apparatus (S) 104 prior to implementation of the remote-access VPN.

And, in this embodiment the mediating apparatus (S) 104 generates the common key KEY_AB, and sends the common key KEY_AB to both of the VPN client unit (A) 101 and the VPN gateway unit (B) 103, by which the VPN client unit (A) 101 and the VPN gateway unit (B) 103 are allowed to receive the common key KEY_AB. Accordingly, the VPN client unit (A) 101 and the VPN gateway unit (B) 103 can share online the common key KEY_AB that is used for authentication in the IKE phase 1.

And, in this embodiment the mediating apparatus (S) 104 authenticates the VPN gateway unit (B) 103, and only when the authentication is successful, the mediating apparatus (S) 104 stores the private IP address IPADDRESS_C of the communication unit (C) 111 sent from the VPN gateway unit (B) 103. This enables the mediating apparatus (S) 104 to store the private IP address IPADDRESS_C alone that is sent from a non-masqueraded VPN gateway unit (B) 103. Accordingly, the VPN client unit (A) 101 can learn the private IP address IPADDRESS_C sent from the valid VPN gateway unit (B) 103.

And, in this embodiment, the mediating apparatus (S) 104 encrypts the communication channel between it and the VPN gateway (B) 103 in the operation of the mediating apparatus (S) 104 that authenticates the VPN gateway unit (B) 103 and stores the private IP address IPADDRESS_C of the communication unit (C) 111 sent from the VPN gateway unit (B) 103 only when the authentication is successful. This ensures that the mediating apparatus (S) 104 receives the private IP address IPADDRESS_C of the communication unit (C) 111 sent from the VPN gateway unit (B) 103 without tampering and eavesdropping of the IP address. Accordingly, the VPN client unit (A) 101 can learn the valid private IP address IPADDRESS_C of the communication unit (C) 111 sent from the valid VPN gateway unit (B) 103. Besides, the VPN gateway unit (B) 103 can send the valid private IP address IPADDRESS_C of the communication unit (C) 111 to the mediating apparatus (S) 104 without allowing it to become known to an indefinite number of general public.

And, in this embodiment, the mediating apparatus (S) 104: authenticates the VPN client unit (A) 101; and, only when the authentication is successful, obtains the IP address IPADDRESS_B assigned to the VPN gateway unit (B) 103 from the domain name server (DNS) 105 by putting thereto a query; then generates the common key KEY_AB, and sends all of the thus obtained IP address IPADDRESS_B, the IP address IPADDRESS_C assigned to the communication unit (C) 111 and the generated common key KEY_AB to the VPN client unit (A) 101. As a result, unless the VPN client unit (A) 101 is masqueraded, the mediating apparatus (S) 104 is allowed to send all of the IP address IPADDRESS_B assigned to the VPN gateway unit (B) 103, the private IP address IPADDRESS_C assigned to the communication unit (C) 111, and the common key KEY_AB to the VPN client unit (A) 101. Accordingly, only the valid VPN client unit (A) 101 is allowed to implement the remote-access VPN to the communication unit (A) 111 via the VPN gateway unit (B) 103 in the IPsec tunnel mode.

And, in this embodiment, the mediating apparatus (S) 104: decides whether or not the VPN client unit (A) 101 has the right to retrieve the IP address IPADDRESS_B assigned to the VPN gateway unit (B) 103; and only when the VPN gateway unit has the right, obtains the IP address IPADDRESS_B assigned to the VPN gateway unit (B) 103 from the domain name server (DNS) 105 by putting thereto a query, then generates the common key KEY_AB, and sends all of the thus obtained IP address IPADDRESS_B, the IP address IPADDRESS_C assigned to the communication unit (C) 111, and the generated common key KEY_AB to the VPN client unit (A) 101. This enables the mediating apparatus (S) 104 to send all of the IP address IPADDRESS_B assigned to the gateway unit (B) 103, the private IP address IPADDRESS_C assigned to the communication unit (C) 111, and the common key KEY_AB only to the VPN gateway unit (B) 103 and the VPN client unit (A) 101 having the authority of access to the communication unit (C) 111. Accordingly, it is possible to protect the VPN gateway unit (B) 103 and the communication unit (C) 111 from the remote-access VPN in the IPsec tunnel mode from an indefinite number of general public.

And, in this embodiment, the mediating unit (S) 104 encrypts the communication channel between the mediating apparatus (S) 104 and the VPN client unit (A) 101. Hence, the mediating apparatus (S) 104 can send the IP address IPADDRESS_B assigned to the VPN gateway unit (B) 103, the private IP address IPADDRESS_C assigned to the communication unit (C) 111 and the common key KEY_AB to the VPN client unit (A) without tampering and eavesdropping of them. Accordingly, the VPN client unit (A) 101 can implement the remote-access VPN to the valid communication unit (C) 111 via the valid VPN gateway unit (B) 103 in the IPsec tunnel mode.

And, in this embodiment, the mediating apparatus (S) 104 authenticates the VPN gateway unit (B) 103, and only when the authentication is successful, it sends the IP address IPADDRESS_A assigned to the VPN client unit (A) 101, its attribute information ATTRIBUTE_A, and the common key KEY_AB to the VPN gateway unit (B) 103. As a result, unless the VPN gateway unit (B) 103 is masqueraded, the mediating apparatus (S) 104 can send the IP address IPADDRESS_A assigned to the VPN client unit (A) 101, its attribute information ATTRIBUTE_A, and the common key KEY_AB to the VPN gateway unit (B) 103. Accordingly, the VPN client unit (A) 101 is allowed to implement the remote-access VPN to the communication unit (C) 111 via the valid VPN gateway unit (B) 103 in the IPsec tunnel mode.

And, in this embodiment, the mediating apparatus (S) 104 encrypts the communication channel between it and the VPN gateway (B) 103 in the operation of the mediating apparatus (S) 104 that authenticates the VPN gateway unit (B) 103 and sends the IP address IPADDRESS_A assigned to the VPN client unit (A) 101, its attribute information ATTRUBUTE_A, and the common key KEY_AB to the VPN gateway unit (B) 103 only when the authentication is successful. This ensures that the mediating apparatus (S) 104 sends all of the IP address IPADDRESS_A assigned to the VPN client unit (A) 101, its attribute information ATTRUBUTE_A, and the common key KEY_AB to the VPN gateway unit (B) 103 without their tampering and eavesdropping. Accordingly, the VPN gateway unit (B) 103 and the communication unit (C) 111 can implement the remote-access VPN to the valid VPN client unit (A) 101 in the IPsec tunnel mode.

And, in this embodiment, the mediating apparatus (S) 104 authenticates the VPN client unit (A) 101 and the VPN gateway unit (B) 103 by the SPKI scheme. This permits authentication of the public key certificate CERT_A of the VPN client unit (A) 101 and the public key certificate CERT_B of the VPN gateway unit (B) 103 by sending them to the mediating apparatus (S) 104. Accordingly, personal information on the VPN client unit (A) 101 can be concealed from the VPN gateway unit (B) 103. Similarly, personal information on the VPN gateway unit (B) 103 can be concealed from the VPN client unit (A) 101.

Incidentally, in the case where the hash value HASH_B of the public key PUBLICKEY_B, an arbitrary hashing algorithm, and its IP address IPADDRESS_B are managed in association with each other in the domain name server (DNS) 105 in this embodiment, shown in FIGS. 12 and 13, the VPN gateway unit (B) 103 needs only to generate the hash value HASH_B of the public key PUBLICKEY_B and enter the hash value HASH_B and the IP address IPADDRESS_B into the domain name server (DNS) 105. And, obviously, this can also be achieved by changing the DNS query in step 1502 of the FIG. 16 procedure to a DNA query containing the hash value HASH_B of the public key PUBLICKEY_B by an arbitrary hashing algorithm.

And, instead of associated management of the public key PUBLICKEY_A and the IP address IPADDRESS_C in the access control list (ACL), the hash value HASH_A of the public key PUBLICKEY_A by an arbitrary hashing algorithm and the IP address IPADDRESS_C may be placed under associated management of the access control list. Obviously, this modification can be made by changing step 1302 of the FIG. 14 procedure to a step wherein the VPN gateway unit (B) 103 generates the hash value HASH_A of the public key PUBLICKEY_A and then sends the hash value HASH_A and the IP address IPADDRESS_C as associated data to the access control list (ACL). Further, the modification can be made by changing step 1605 of the FIG. 17 procedure to a step of generating the hash value HASH_A of the public key PUBLICKEY_A and presenting the hash value HASH_A to the access control list ACL to search it.

Further, only the global IP address IPADDRESS_A is assigned to the VPN client unit (A) 101, but an arbitrary private IP address in the local area network LAN may also be additionally assigned to the VPN client unit (A) 101 by such a method as set forth in non-patent document 4.

EMBODIMENT 3

Figure 18:
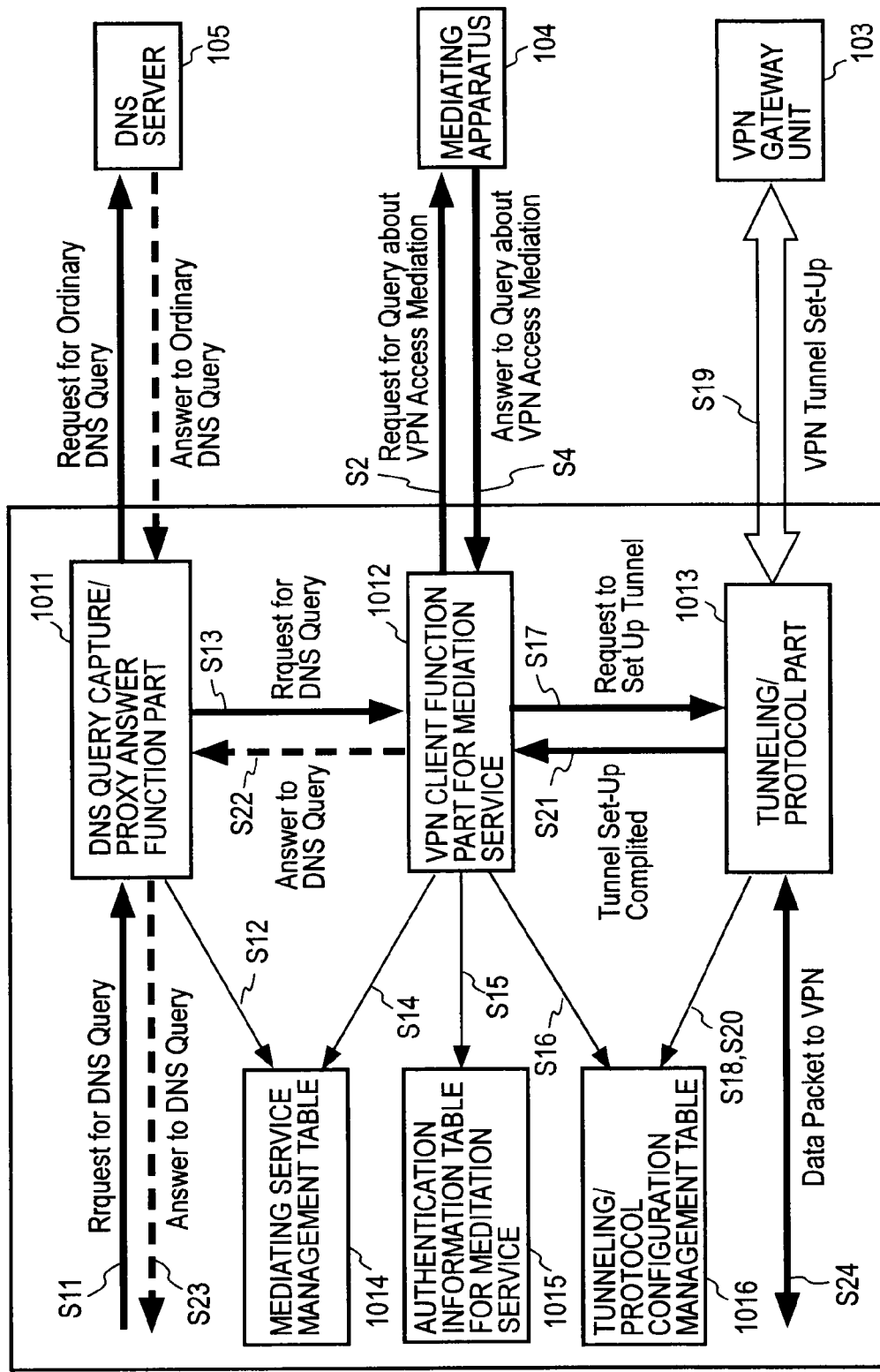
[FIG. 18] is a diagram illustrating an embodiment of VPN client unit in a third embodiment of the present invention.

FIG. 18 illustrates a practical functional configuration of the VPN client unit in Embodiments 1 and 2 described above. The VPN client unit 101 is provided with: a DNS query capture/proxy answer function part 1011 that captures a DNS request from this unit and makes a proxy answer thereto; a mediation-service VPN client function part 1012 that performs a VPN client function of the mediation service of the present invention; and a tunneling protocol function part 1013 for implementing VPN access. Furthermore, there are provided: a mediation service management table 1014 for distinguishing between ordinary DNS queries and mediation services, and for their management; a mediation-service authentication information table 1015 for mutual authentication with a mediation server; and a tunneling/protocol configuration management information table 1016 for encrypted communications with the VPN gateway unit.

The mediation service management table 1014 has stored therein:
- a) Postfix for mediation service: domain name that is transferred to mediation service (e.g. *.vpn),
- b) IP address or host name of the mediating apparatus: IP address of the mediating apparatus,
- c) Authentication scheme with the mediating apparatus (SPKI scheme, PKI scheme, challenge-response scheme, key-sharing scheme, etc.),
- d) Name of certificate for authentication (refer to certificate/secret data corresponding to authentication scheme).

The mediation-service authentication information table 1015 has stored therein:
- a) Table of hash values corresponding to domain names that are used to search the VPN gateway unit,
- b) Various certificates that are used for client authentication by the VPN client unit (SPKI certificate, PKI certificate, password, common key, etc.),
- c) Certificates that are used for authentication of the mediating apparatus by the server (SPKI certificate, PKI certificate, password, common key, etc.)

The tunneling/protocol configuration management table is roughly classified into the following two kinds:
- (1) Configuration management information for setting up a tunnel; and
- (2) Configuration management information on the set-up tunnel as a virtual network interface (Nw.I/F). Their detailed examples are given below.

(1) Configuration management information for setting up a tunnel
- A) IP address of the tunnel starting point (IP address given to the VPN client unit from the network).
- B) IP address of the tunnel terminating point (IP address given to the VPN gateway unit from the network).
- C) Protocol for tunneling (IPsec tunnel mode, PPP over IPsec, etc.).
- D) Authentication scheme (SPKI scheme, PKI scheme, challenge-response scheme, key-sharing scheme, etc.)
- E) Name or the like of the certificate for authentication (refer to the certification/secret data corresponding to the authentication scheme.

(2) Configuration management information on the set-up tunnel as a network interface (Nw.I/F)
- a) Kind of virtual Nw.I/F (virtual PPP, virtual Ethernet, etc.),
- b) IP address of virtual Nw.I/F
- c) IP addresses of gateway, DNS server, WIN server, etc.
- d) Information on routing to virtual Nw.I/F.

Those of the above-mentioned pieces of information which are provided from the mediating apparatus are:

The information B) in item (1). In addition, the pieces of information C), D) and E) may also be provided.

Those of pieces of information B), C) and D) in item (2) which are not dynamically posted from the VPN gateway unit (which pieces of information may be provided from either one of the mediating apparatus and the VPN gateway unit). The mediation processing in this embodiment is performed as described below. In the first place, the application issues, prior to communication, a DNS query request for querying about the IP address of the VPN gateway unit that offers a VPN service desired to access (step S11). This request is captured once by the DNS query capture/proxy answer function part 1011, which refers to the mediation service management table 1014 to decide whether the request concerns the mediation service or not. If the request has nothing to do with the mediation service, it is regarded as an ordinary DNS request, then ordinary DNS processing is performed for the DNS server 105 to obtain the IP address from its answer, and ordinary connection processing is carried out using it (step S12).

If the DNS inquiry request concerns the mediation service, it is transferred to the mediation-service VPN client function part 1012 (step S13). The mediation-service VPN client function part 1012 selects a predetermined mediation server according to the contents of the mediation service management table 1014 (step S14), and performs mutual authentication using the mediation-service authentication information table 1015 (step S15). Then the mediation-service VPN client function part sends the mediation request, referred to with respect to the above-described embodiment, to the mediating apparatus 104 (step S2) and obtains its answer (step S4). Based on this information, the mediation-service VPN client function part updates information such as the VPN gateway addresses and common keys in the tunneling/protocol configuration management table 1016 (step S16) and, if a predetermined tunnel is not set up yet, it sends a tunnel set-up request to the tunneling/protocol 1013 (step S17).

The tunneling/protocol part 1013 refers to the tunneling/protocol configuration management table 1016 to identify the VPN gateway unit 103 that is the opposite side of the tunnel (step S18), and sets up a tunnel for encrypted communications with the VPN gateway unit 103 by use of the common key set by the present mediation function (step S19). Once the tunnel is normally set up, part of configuration management information, such as the private IP address of the VPN client unit 101, internal DNS and routing-related information, can be dynamically passed from the VPN gateway unit 103 by use of the method set forth in patent document 4, non-patent document 1, non-patent documents 2, or non-patent document 3. In this case, the tunneling/protocol part uses these pieces of information t update the tunneling/protocol configuration management table 1016 (step S20), and sends an answer of tunnel set-up completion to the mediation-service VPN client function part 1012 (step S21).

When the set-up of the VPN tunnel is normally completed, the mediation-service VPN client function part 1012 sends the private IP address of the communication unit obtained in step S4, as an answer to the DNS query, to the DNS query capture/proxy answer function part 1011 (step S22). This answer is sent intact to the application that issued the DNS query (step S23). The application conducts VPN communication via the set VPN tunnel (step S24).

EMBODIMENT 4

Figure 19:
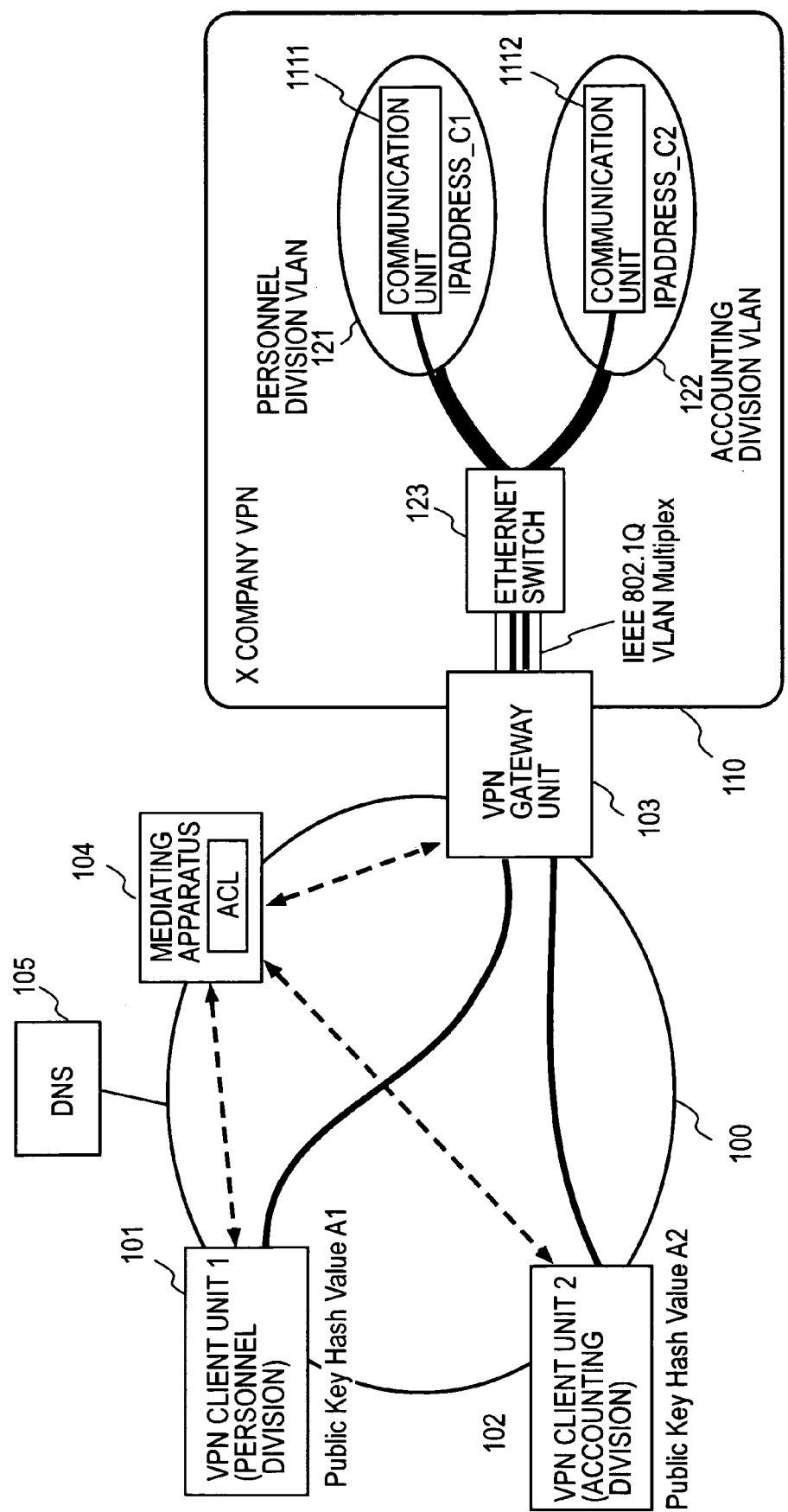
[FIG. 19] is a diagram illustrating the entire configuration of a network in which VPN gateway unit in a fourth embodiment of the present invention is used.

FIG. 19 illustrates an example of the entire system configuration embodying the present invention. In this embodiment, assume that VPN client units 101 and 102 are used for a personnel division and an accounting division, and that they have public key hash values A1 and A2, respectively. Let it be assumed that the VPNs placed under the management of the VPN gateway unit 103 are a personal division VLAN 121 and an accounting division VLAN 122, and that the VPN gateway unit 103 is connected via an ethernet switch 123 to both of VLANs 121 and 122 by IEEE 802.IQ VLAN tag multiplexing. Further, assume that the mediating apparatus 104 has pre-uploaded thereto the access control list (ACL) shown in FIG. 20 for the VPN gateway unit 103. In this ACL it is declared that the VPN client unit 101 having a public key of hash value HASH_A1 has attribute information "(VLAN Personal Division VLAN)", whereas the VPN client 102 having a public key of hash value HASH_A2 has attribute information "(VLAN Personnel Division VLAN)".

Figure 21:
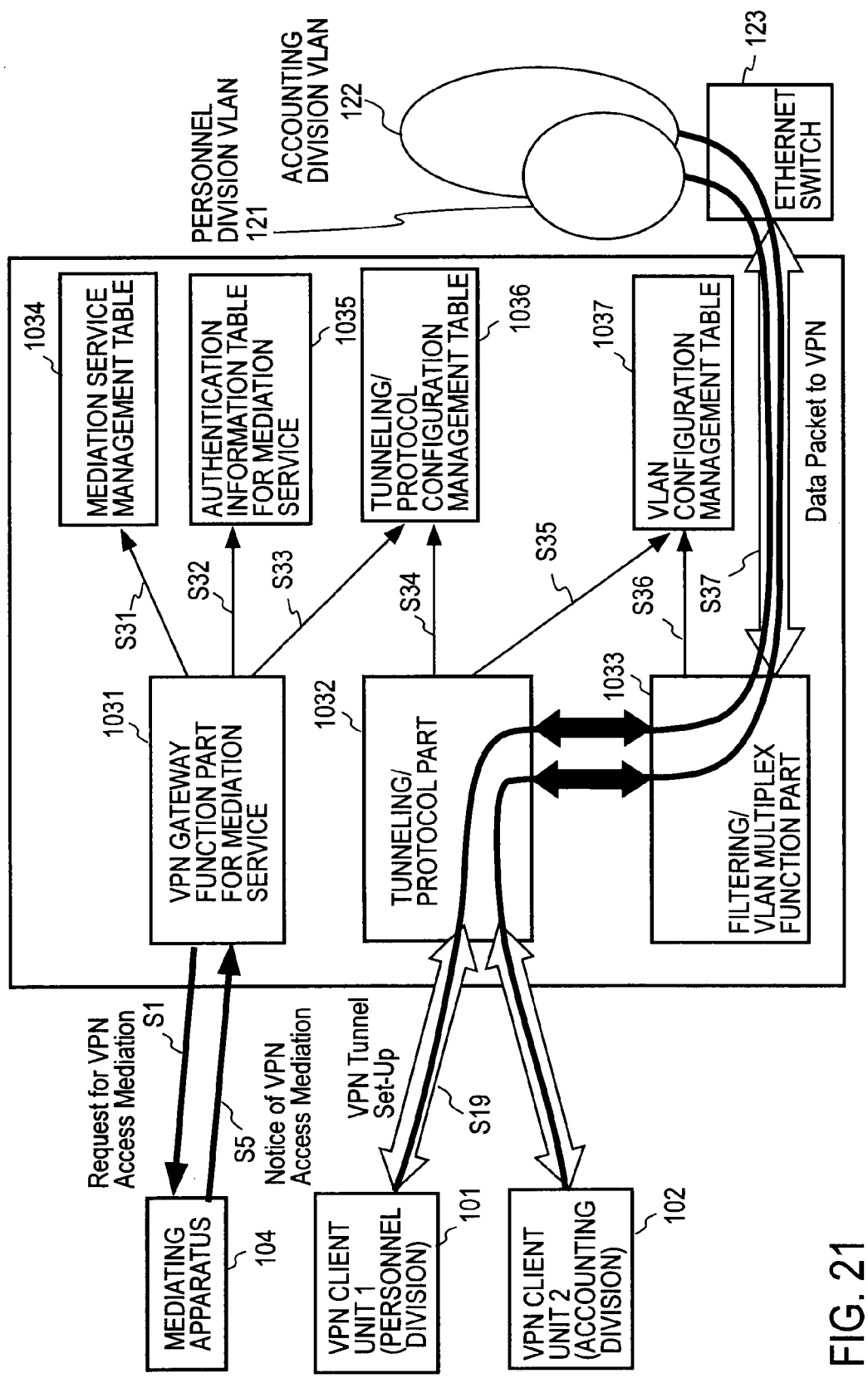
[FIG. 21] is a diagram illustrating an example of the functional configuration of the VPN gateway unit for use in the fourth embodiment.

FIG. 21 illustrates the functional configuration of the VPN gateway unit 103 in this embodiment. The VPN gateway unit 103 is provided with: a mediation-service VPN gateway function part 1031 that performs communications with the mediating apparatus 104 and processing therefor; a tunneling/protocol part 1032 that terminates tunnels from multiple VPN client units; a filtering/VLAN multiplex function part 1033 that stores data packets extracted from the tunnels in predetermined VLANs in VPNs and filters out those of packets input to and output from the tunnels which raise security concerns. Furthermore, there are provided: a mediation service management table 1034 having information necessary for connection with the mediating apparatus 104; a mediation-service authentication information table 1035 for authentication with the mediating apparatus 104; a tunneling/protocol configuration management table 1036 holding configuration management information on tunnels to the VPN client units 101 and 102; and VLAN configuration management table 1037 holding configuration management information on each VLAN placed under the management of the VPN gateway unit 103.

In the mediation-service management table 1034 there is held the following pieces of information for each mediating apparatus to be used.
  a) IP address or host name of the mediating apparatus: IP address of the mediating apparatus.
  b) Authentication scheme with the mediating apparatus (SPKI scheme, PKI scheme, challenge-response scheme, key-sharing scheme, etc.)
  c) Name of certificate or the like for authentication (refer to the certificate/secret data corresponding to the authentication scheme).

In the mediation-service authentication information table 1035 there are held such pieces of information as listed below.
  a) Various certificates that are used for authentication of VPN gateway unit by the VPN client unit (SPKI certificate, PKI certificate, password, common key, etc.),
  b) Certificates that are used for authentication of the mediating apparatus (SPKI certificate, PKI certificate, password, common key, etc.)

In the tunneling/protocol configuration management table there are held the following pieces of information for each tunnel to the VPN client unit.
  a) IP address of the tunnel starting point (IP address given to the VPN client unit from the network).
  b) Protocol of tunneling (IPsec tunnel mode, PPP over IPsec, etc.).
  c) Authentication/encryption scheme (SPKI1 scheme, PKI scheme, challenge-response scheme, key-sharing scheme, etc.). The tunnel that is set up to the VPN gateway unit as the result of mediation service is of the key-sharing scheme.
  d) Name of certificate or the like for authentication (refer to the certificate/secret data corresponding to the authentication scheme).
  e) Common key and attribute information posted from the mediation service.
  f) Name of VLAN to which the tunnel is connected. "Personnel Division VLAN" or "Accounting Division VLAN."
  g) Private IP address delivered to the VPN client unit (Selected from among addresses d) in the VLAN configuration management table).

In the VLAN configuration management table 1037 there are held the following pieces of information for each VLAN.
  a) Name of VLAN ("Personnel Division VLAN" or "Accounting Division VLAN").
  b) Network configuration management information of VLAN.
    i) IP addresses of gateway, DNS server, WINS server, etc.
    ii) Routing information to be posted to VPN client unit.
  c) Packet filtering condition (which limits accessible services)

d) Range of private IP addresses deliverable to VPN client unit.

The VPN gateway unit 103 provides a secure communication channel to the mediating apparatus 104 by use of the mediation service management information table 1034 (step 31) and the mediation-service authentication information table 1035, (step 32) and issues a VPN access mediation request (step S1). For example, upon authentication of the VPN client unit 101, the mediating apparatus 104 sends a VPN access mediation notice to the VPN gateway unit 103 (step S5). The notice information (IP address IPADDRESS_A1 of the VPN client unit 101, common key KEY_AB, attribute information ATTRIBUTE_A1, etc.) is stored in the tunneling/protocol configuration management table 1036. Based on the attribute information, the VLAN 121 to be accommodated is determined, and the VLAN name "Personnel Division VLAN" is also stored in this table (step S33). In this instance, the VPN client unit 101 is notified that it has the attribute information (VLAN Personnel Division) as shown in FIG. 20. Accordingly, it is determined that VLAN to accommodate the tunnel from the VPN client unit 101 is "Personnel Division VLAN."

Upon issuance of a VPN tunnel set-up request from the VPN client unit 101 (step S19), the VPN gateway unit refers to the tunneling/protocol configuration management table 1036 (step S34), then performs predetermined authentication/encryption, after which it refers to the VLAN configuration management table 1037 of the corresponding VLAN 121 (step S35), then selects unused one of private IP addresses deliverable to the VPN client unit 101, and posts it to the VPN client unit 101, together with network configuration management information (addresses of the gateway, DNS, the WINS server, and so on). In this instance, the private IP address of the VPN client unit 101 is delivered from the address table of the personnel division VLAN. Also, network configuration management information on the gateway, DNS, etc. is posted from the personnel division VLAN.

Upon arrival of a VPN-destined data packet at the VPN gateway unit through the above-mentioned tunnel from the VPN client unit 101, it is subjected, with reference to the VLAN configuration management table 1037 (step S36), to filtering based on the filter condition of VLAN having accommodated therein the tunnel, thereafter being transferred to the VLAN (step S37). Besides, filtering for each tunnel may be additionally set using attribute information. Similar processing is also carried out for the request from the VPN client unit 102. In the case of disconnecting the tunnel, the corresponding entry is removed from the tunneling/protocol configuration management table 1036, and the private IP address assigned to the VPN client unit is returned to an address pool of the VLAN concerned. As described above, according to the present invention, the mediating apparatus stores information (access control list) that is used to establish a remote-access VPN by an arbitrary tunneling protocol, such as IPsec or L2TP, between each of the VPN client unit connected to the IP network and the VPN gateway unit, and an arbitrary communication unit connected to the local area network placed under the management of the VPN gateway unit. This information contains the private IP address assigned to the communication unit.

On receiving from the VPN client unit a request for retrieval of the IP address assigned to the VPN gateway unit, the mediating apparatus verifies whether the VPN client unit has a right to retrieve the IP address assigned to the VPN gateway unit. And, only when the VPN client unit has the right, the mediating apparatus refers to the access control list and acquires therefrom the private IP address assigned to the communication unit connected to the local area network placed under the management of the VPN gateway unit and the attribute information of the VPN client unit, then searches the domain name server to obtain the IP address assigned to the VPN gateway unit, and generates the common key that is used for authentication by IKE or the like between the VPN client unit and the VPN gateway unit. Then the mediating apparatus encrypts the communication channel between it and the VPN client unit, and sends the IP address assigned to the VPN gateway unit, the private IP address assigned to the communication unit, and the common key to the VPN client unit over the encrypted communication channel. Further, the mediating apparatus encrypts the communication channel between it and the VPN gateway unit, and sends the IP address assigned to the VPN client unit, the generated common key, and the attribute information on the client unit to the VPN gateway unit over the encrypted communication channel. Incidentally, the host name in the DNS query of the VPM gateway unit may be regarded as a VPN portal service that is provided via the gateway unit, rather than a physical VPN gateway unit. This service is provided from the communication unit having a private IP address. By giving multiple host names to one VPN gateway unit and entering them into DNS, it is possible to link multiple communication units having different private IP addresses. For example, when a customer-specific and an in-house communication unit are in the VPN placed under the management of the VPN gateway unit, a customer-specific and an in-house access units may be connected to the corresponding communication units, respectively, by giving different host names to them and managing them by different access control lists.

And, the mediating apparatus authenticates the VPN client unit and the VPN gateway unit by the SPKI scheme. And the VPN client unit issues certificates by the SPKI scheme. Further, the mediating apparatus also enables authentication of the VPN client unit and the VPN gateway unit by the PKI scheme.

Further, the mediating apparatus enables identification of the VPN client unit, the VPN gateway unit and the communication unit by arbitrary name formats such as public key, FQDN (Fully Qualified Distinguished Name), GUID (Globally Unique Identifier), MAC address, SPKI (Simple Public Key Infrastructure), Local Name, X.500 Distinguish Name, etc. This permits implementation of the remote-access VPN by a combination of IPsec, L2TP or arbitrary tunneling protocol and PKI, SPKI, password or arbitrary authentication scheme.

Needless to say, it is possible to carry out the present invention by programming the processing function of part or whole of each unit or apparatus in the systems of Embodiments 1 to 4 described above and by executing the program by a computer, or it is possible to program the procedures described with reference to Embodiments 1 and 2 and execute the program by a computer. The program for implementing the processing function by a computer, or a program for performing the processing function by a computer can be retained or dispensed by recording the program on a computer-readable recording medium such as, FD, MO, ROM, memory card, CD, DVD, removable disk, or the like; furthermore, the program can be distributed over the Internet or similar network.

The invention claimed is:

1. A remote-access VPN mediating method in a system wherein; VPN client units and a VPN gateway unit are connected to an IP network; communication units are connected to a local area network placed under the management of the VPN gateway unit; and a remote-access VPN by a tunneling protocol is implemented between an arbitrary one of the VPN client units and the VPN gateway unit connected to said IP network and an arbitrary one of the communication units connected to the local area network placed under the management of the VPN gateway unit, where VPN represents virtual private network, said method comprising the steps of:

(a) sending an access control list containing information indicative of a private IP address assigned to said communication unit to a mediating apparatus on said IP network from said VPN gateway unit, said mediating apparatus being a separate and distinct apparatus from the VPN gateway unit;

(b) storing said access control list in said mediating apparatus in correspondence to said VPN gateway unit;

(c) retrieving, by said mediating apparatus, an IP address of said VPN gateway unit in response to a request from said VPN client unit, acquiring the private IP address of the corresponding communication unit from said access control list, sending the acquired IP address of said VPN gateway unit and the acquired private IP address to said VPN client unit, sending an IP address of said VPN client unit to said VPN gateway unit, generating mutual authentication information for setting up an authenticated encrypted tunnel between said VPN client unit and said VPN gateway unit, and sending said mutual authentication information to both of said VPN client unit and said VPN gateway unit; and (d) setting up said authentication encrypted tunnel between said VPN client unit and said VPN gateway unit by use of said mutual authentication information, and implementing remote access through said encrypted tunnel by use of the private IP address of said communication unit.

2. The remote-access mediating method of claim 1, wherein said access control list contains attribute information about VPN client unit.

3. The remote-access VPN mediating method of claim 2, wherein said step (a) includes a step of encrypting a communication channel between said mediating apparatus and said VPN gateway unit or a VPN gateway management unit having an authority of its management, and sending said access control list from said VPN gateway unit to said mediating apparatus.

4. The remote-access VPN mediating method of claim 2 or 3, wherein said step (b) includes steps of:

authenticating said VPN gateway unit by said mediating apparatus; and storing an access control list for said VPN client unit sent from said VPN gateway unit when the authentication is successful.

5. The remote-access VPN mediating method of claim 2 or 3, wherein said step (c) includes the steps of:

(c-0) on receiving a request for retrieval of an IP address assigned to said VPN gateway unit from said VPN client unit, verifying whether said VPN client unit has an authority of access to said VPN gateway unit; and only when said VPN client unit has said access authority, (c-1) referring to an access control list, and acquiring the private IP address assigned to said communication unit;

(c-2) searching a domain name server to acquire the IP address assigned to said VPN gateway unit;

(c-3 generating said mutual authentication information for authentication between said VPN client unit and said VPN gateway unit;

(c-4) encrypting a first communication channel between said mediating apparatus and said VPN client unit, and sending said mutual authentication information, the IP address of said VPN gateway unit and the private IP address of said communication unit to said VPN client unit;

(c-5) encrypting a second communication channel between said mediating apparatus and said VPN gateway unit, and sending to said VPN gateway unit said mutual authentication information, an IP address of said VPN client unit and said attribute information about said VPN client unit described in said access control list.

6. The remote-access VPN mediating method of claim 5, comprising the steps:

wherein, at the time of setting up the encrypted tunnel between said VPN client unit and said VPN gateway unit, said VPN gateway unit performs at least one of: a function of determining the private IP address to be given to said VPN client unit on the basis of said attribute information on said VPN client unit sent from said mediating apparatus, and giving the determined private IP address to said VPN client unit; a function of determining a VLAN to be accommodated on the basis of said attribute information about said VPN client unit, a gateway address, an internal DNS address, a WINS server address, etc.; and a function of changing packet filtering setting of said VPN gateway unit on the basis of said attribute information; and wherein when the tunnel established between said VPN gateway unit and said VPN client unit is disconnected or no communication has been conducted via said tunnel for a predetermined period of time, said VPN gateway unit performs tunnel cleanup processing, processing for returning the private IP address assigned to said VPN client unit, and restoring the setting of the packet filtering of said VPN gateway unit used for said VPN client unit concerned.

7. The remote-access VPN mediating method of claim 2 or 3, wherein: letting a domain name server be denoted by DNS, said step (c) includes a step wherein said VPN client unit captures a DNS query transferred from an in-unit application or another VPN client unit, then collates the source address and contents of said query with filtering conditions, and, if they match the conditions, converts said query to a query to said mediating apparatus; said step (d) includes a step of setting/updating tunneling protocol configuration management information on the basis of an answer to said query; and said step (e) includes a step of initializing the tunnel as required, passing the private IP address of the communication unit specified by said mediating unit, as the result of said DNS query, to the application of the query source.

8. The remote-access VPN mediating method of claim 5, wherein, letting simple public key infrastructure be denoted by SPKI, said step (c) includes a step wherein said VPN client unit issues a certificate by an SPKI scheme, and another VPN client unit having received said certificate sends to said mediating apparatus a request for retrieval of the IP address assigned to said VPN gateway unit.

9. A remote-access VPN mediating apparatus which is built on an IP network to implement a remote-access VPN representing virtual private network in a system wherein: VPN client units and a VPN gateway unit are connected to the IP network; communication units are connected to a local area network placed under the management of the VPN gateway unit; and a remote-access VPN by a tunneling protocol is implemented between an arbitrary one of said VPN client units and said VPN gateway unit connected to said IP network and an arbitrary one of said communication units connected to said local area network placed under the management of said VPN gateway unit, said mediating apparatus being a separate and distinct apparatus from the gateway unit and comprising:

ACL storage means for storing an access control list, hereinafter referred to as ACL, sent from said VPN gateway unit and containing information indicative of a private IP address assigned to said communication unit;

authentication/access authorization control means for authenticating said VPN client unit and said VPN gateway unit, and for executing access authorization control;

IP address acquiring means for referring to said access control list to acquire the private IP address assigned to said communication unit, and for searching a domain name server to acquire an IP address assigned to said VPN gateway unit;

authentication information generating means for generating mutual authentication information for setting up an authenticated encrypted tunnel between said VPN client unit and said VPN gateway unit; and communication means for sending the IP address of said VPN gateway unit, the private IP address of said communication unit and said mutual authentication information to said VPN client unit, and for sending the IP address of said VPN client unit and said mutual authentication information to said VPN gateway unit.

10. The mediating apparatus of claim 9, wherein said communication means includes encryption means for encrypting communications between said mediating apparatus and said VPN client unit, and communications between said mediating apparatus and said VPN gateway unit.

11. The mediating apparatus of claim 9, wherein said authentication/access authorization control means is configured to:

authenticate said VPN client unit; and only when the authentication is successful, cause said IP address acquiring means to query the domain name server about the IP address assigned to said VPN gateway unit and acquire said IP address; cause said mutual authentication information generating means to generate said mutual authentication information; and cause said communication means to send the acquired IP address, the private IP address assigned to said communication unit, and said generated mutual authentication information to said VPN client unit.

12. The mediating apparatus of claim 9, wherein said authentication/access authorization control means is configured to:

decide whether said VPN client unit has the authority to retrieve the IP address assigned to said VPN gateway unit; and only when the VPN client unit has said authority, cause said IP address acquiring means to query the domain name server about the IP address assigned to said VPN gateway unit and acquire said IP address; cause said mutual authentication information generating means to generate said mutual authentication information; and cause said communication means to send the acquired IP address, the private IP address assigned to said communication unit, and said generated mutual authentication information to said VPN client unit.

13. The mediating apparatus of claim 11 or 12, wherein said authentication/access authority control means is configured to:

authenticate said VPN gateway unit; and only when the authentication is successful, causes said communication means to send the IP address assigned to said VPN client unit and said mutual authentication information to said VPN gateway unit.

14. The mediating apparatus of claim 9, wherein said authentication/access authorization control means is configured to authenticate said VPN client unit and said VPN gateway unit by an SPKI (Simple Public Key Infrastructure) scheme, and/or executes access authorization control.

15. The mediating apparatus of claim 9, wherein said authentication/access authorization control means authenticates said VPN client unit and said VPN gateway unit by a PKI (Public Key Infrastructure) scheme.

* * * * *